US009492873B2

(12) United States Patent
Bhagath

(10) Patent No.: US 9,492,873 B2
(45) Date of Patent: Nov. 15, 2016

(54) CLAMP MECHANISM OF CUTTING INSERT, CUTTING TOOL, CUTTING INSERT, AND CLAMP MEMBER

(71) Applicant: TUNGALOY CORPORATION, Iwaki-shi, Fukushima (JP)

(72) Inventor: Kedar Suresh Bhagath, Iwaki (JP)

(73) Assignee: Tungaloy Corporation, Iwaki-shi, Fukushima (JP)

(*) Notice: Subject to any disclaimer, the term of this patent is extended or adjusted under 35 U.S.C. 154(b) by 253 days.

(21) Appl. No.: 14/363,739

(22) PCT Filed: Dec. 10, 2012

(86) PCT No.: PCT/JP2012/081938
§ 371 (c)(1),
(2) Date: Jun. 6, 2014

(87) PCT Pub. No.: WO2013/089064
PCT Pub. Date: Jun. 20, 2013

(65) Prior Publication Data
US 2014/0321929 A1    Oct. 30, 2014

(30) Foreign Application Priority Data

Dec. 15, 2011    (JP) ................................. 2011-274285

(51) Int. Cl.
*B23B 27/04*    (2006.01)
*B23B 27/08*    (2006.01)
(Continued)

(52) U.S. Cl.
CPC ......... *B23B 27/1625* (2013.01); *B23B 27/045* (2013.01); *B23B 27/08* (2013.01);
(Continued)

(58) Field of Classification Search
CPC ... B23B 2205/02; B23B 27/04; B23B 27/08; B23B 27/1625; Y10T 407/2282; Y10T 407/2272; Y10T 407/25; Y10T 407/2274; Y10T 407/2284; Y10T 407/2276
See application file for complete search history.

(56) References Cited

U.S. PATENT DOCUMENTS 1,443,752 A * 1/1923 Lindmark ............... B23B 27/16
407/102
1,575,315 A * 3/1926 Bowman ............... E21C 35/193
299/102
(Continued)

FOREIGN PATENT DOCUMENTS

JP    2009-000754    1/2009
WO    WO 99/30860    6/1999

OTHER PUBLICATIONS

Official Action dated Feb. 3, 2015 issued in Japanese counterpart application (No. 2013-549254).
(Continued)

*Primary Examiner* — Sunil K Singh
*Assistant Examiner* — Ryan Rufo
(74) *Attorney, Agent, or Firm* — Womble Carlyle

(57) ABSTRACT

A clamp mechanism includes a plug element (24) extending from a main section of a first member of a clamp member (20) and a cutting insert (1), and a concave portion (5) extending inside a second member. The plug element (24) and the concave portion (5) each include a swollen section (24a, 5a) having a first dimension in a width direction, and a narrow section (24b, 5b) disposed in an area closer to the main section of the first member than the swollen section (24a, 5a) and having a second dimension smaller in the width direction than the swollen section (24a, 5a). The narrow section (5b) of the concave portion (5) interferes with the swollen section (24a) of the plug element (24) to suppress separation of the cutting insert (1) in the guide direction (A) from the clamp member (20).

8 Claims, 23 Drawing Sheets

(51) Int. Cl.
　　*B23B 27/16*　　(2006.01)
　　*B23B 29/04*　　(2006.01)
(52) U.S. Cl.
　　CPC ........ *B23B 29/043* (2013.01); *B23B 2205/02* (2013.01); *Y10T 407/2272* (2015.01); *Y10T 407/2282* (2015.01); *Y10T 407/2286* (2015.01); *Y10T 407/24* (2015.01)

(56) References Cited

U.S. PATENT DOCUMENTS

| | | | |
|---|---|---|---|
| 2,203,104 A * | 6/1940 | Reaney | B23B 27/16 407/108 |
| 3,986,237 A * | 10/1976 | Hertel | B23B 27/16 407/107 |
| 4,946,319 A | 8/1990 | Lyon et al. | |
| 5,100,269 A | 3/1992 | Lyon et al. | |
| 5,836,723 A | 11/1998 | Von Haas et al. | |
| 6,758,638 B1 | 7/2004 | Mihic | |
| 2002/0172568 A1 | 11/2002 | Shiraiwa | |
| 2004/0228694 A1 | 11/2004 | Webb et al. | |
| 2006/0120812 A1 * | 6/2006 | Hecht | B23B 27/04 407/48 |
| 2007/0231089 A1 | 10/2007 | Hecht | |

OTHER PUBLICATIONS

International Search Report dated Mar. 12, 2013 issued in PCT counterpart application (No. PCT/JP2012/081938).

International Prelominary Report on Patentability (Chapter I) dated Jun. 26, 2014 issued in PCT counterpart application (PCT/JP2012/081938).

* cited by examiner

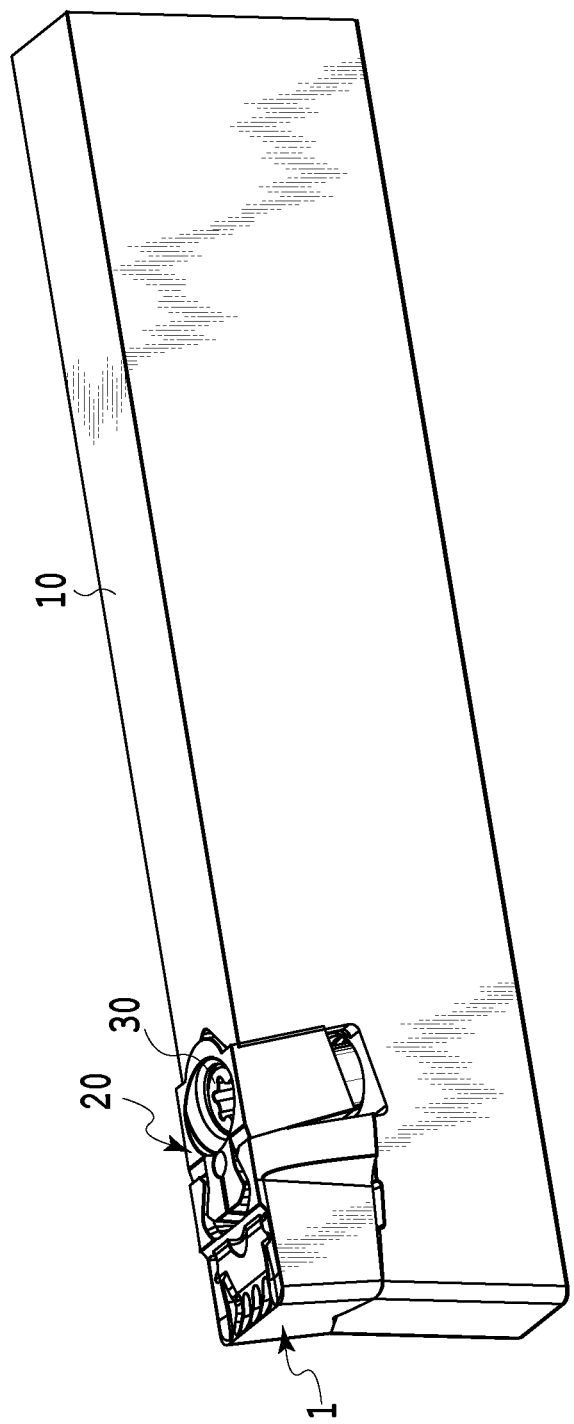

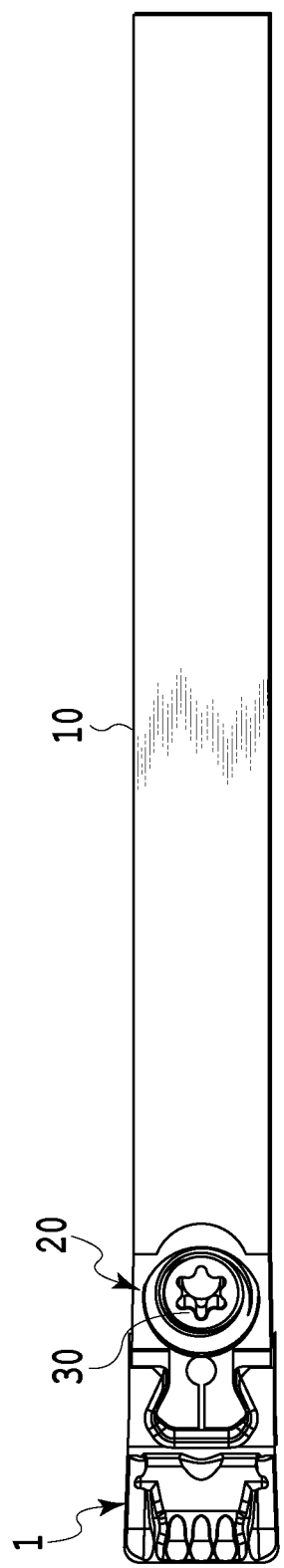

CLAMP MECHANISM OF CUTTING INSERT, CUTTING TOOL, CUTTING INSERT, AND CLAMP MEMBER

RELATED APPLICATIONS

This is a 371 US National Phase of International Patent Application No. PCT/JP2012/081938 filed 2012 Dec. 10, and published as WO2013/089064A1 on Jun. 20, 2013, which claims priority to JP 2011-274285, filed Dec. 15, 2011. The contents of the aforementioned applications are incorporated by reference in their entirety.

TECHNICAL FIELD

The present invention relates to a clamp mechanism for removably attaching a cutting insert to a cutting tool, a cutting tool, a cutting insert, and a clamp member.

BACKGROUND ART

Patent Literature 1 discloses a clamp mechanism for removably attaching a cutting insert to a cutting tool. The clamp mechanism includes a clamp member and a screw member. The cutting insert is provided with a cutting edge on an intersection ridge line between a rake face and a flank, and is provided with a abutment surface abutting a holder in a reverse side to the rake face. In addition, the cutting insert is provided with one abutment surface abutting the clamp member. The holder is provided with a screw hole into which the screw member is threaded. The clamp member is disposed to be movable forward/backward by the screw member. The clamp mechanism according to Patent Literature 1 is suitable primarily for a cutting tool used in a grooving cutting work.

Patent Literature 2 discloses a clamp mechanism for removably attaching a cutting insert to a body of a cutting tool. The clamp mechanism includes a clamp member and a screw member. The cutting insert is provided with a cutting edge on an intersection ridge line between a rake face and a flank, and is provided with a abutment surface abutting the body in a reverse side to the rake face. In addition, it is possible to cause the clamp member to abut two abutment surfaces of the cutting insert. One of the two abutment surfaces of the cutting insert is arranged to be vertical to the abutment surface with the body, and the other is arranged in parallel to the abutment surface with the body. The body is provided with a abutment surface abutting the cutting insert, a abutment surface abutting the clamp member, and a screw hole into which the screw member is threaded. The abutment surface abutting the clamp member is disposed to be inclined relative to the abutment surface abutting the cutting insert. The clamp member is disposed to be movable forward/backward by the screw member. The clamp mechanism according to Patent Literature 2 is also suitable primarily for a cutting tool used in a grooving cutting work.

CITATION LIST

Patent Literature

PTL 1: U.S. Pat. No. 5,100,269 Specification
PTL 2: International Publication No. 01/015839 Pamphlet

SUMMARY OF INVENTION

Technical Problem

In the clamp mechanism of Patent Literature 1, the clamp member and the screw member project upward over the rake face of the cutting insert. Therefore, at the time of executing a grooving cutting work, the clamp member and the screw member block outflow of chips. When the outflow of the chip is blocked, the chip collides with or falls foul of the cutting tool and a work material, or becomes unstable, thus losing stability of chip processing performance. As a result, there occur problems such as frequent stop of a machine or remarkable reduction in tool life.

In the clamp mechanism of Patent Literature 2, an upward projecting amount of each of the clamp member and the screw member is smaller than in the clamp mechanism of Patent Literature 1. However, Patent Literature 2 has no difference in a point of having the upward projection from Patent Literature 1, wherein as similar to the clamp mechanism in Patent literature 1, the clamp member or the screw member basically blocks the outflow of the chip at the grooving cutting work. In addition to it, in this clamp mechanism, a function for suppressing the cutting insert's escaping movement in a direction of a guide plane guiding the cutting insert is weak. Therefore, it is necessary to form fine concave and convex portions on a sliding face in the cutting insert. Because of such fine concave and convex portions of the cutting insert, a corresponding abutment surface of the body is damaged. Therefore, there is a problem that positional accuracy of a tool cutting edge cannot be maintained over a long period of time.

An object of the present invention is to suppress upward projecting amounts of components other than a cutting insert over the cutting insert.

Solution to Problem

An aspect of the present invention relates to a clamp mechanism for removably attaching a cutting insert to a cutting tool, comprising, a clamp member for fixing the cutting insert to the cutting tool, the clamp member being movable forward/backward along a predetermined restraining direction, wherein the cutting tool is provided with a first guide face for guiding the cutting insert in a predetermined guide direction not in parallel to the restraining direction, a first member of the clamp member and the cutting insert is provided with a plug element extending from a main section thereof and a second member of the clamp member and the cutting insert is provided with a concave portion extending therein, and the plug element and the concave portion respectively include, in at least a cross section parallel to the guide direction, a swollen section having a first dimension in the width direction, and a narrow section disposed in an area closer to the main section of the first member than the swollen section and having a second dimension smaller in the width direction than the swollen section, wherein the narrow section of the concave portion interferes with the swollen section of the plug element to suppress separation of the cutting insert in the guide direction from the clamp member.

A different aspect of the present invention relates to a cutting tool including the clamp mechanism according to claim 1.

A different aspect of the present invention relates to a cutting insert that is removably attached to a cutting tool by a clamp member, comprising, a concave portion or a plug element for abutting the clamp member, wherein the concave portion or the plug element includes a swollen section having a first dimension in the width direction, and a narrow section having a second dimension smaller in the width direction than the swollen section.

A different aspect of the present invention relates to a clamp member disposed to be movable forward/backward along a predetermined restraining direction for removably attaching a cutting insert to a cutting tool, comprising, a plug element extending from a main section of the clamp member for abutting a concave portion of the cutting insert, or a concave portion extending inside the clamp member for abutting a plug element of the cutting insert, wherein the plug element or the concave portion includes, in at least a cross section parallel to a predetermined guide direction that is not in parallel to the restraining direction, a swollen section having a first dimension in the width direction, and a narrow section disposed in an area closer to a main section of the clamp member than the swollen section and having a second dimension smaller in the width direction than the swollen section.

Advantageous Effects of Invention

In the clamp mechanism in the present invention, it is possible to suppress upward projection of components over the cutting insert. Therefore, it is possible to provide stable processing performance of chips over a long period of time without being subjected to interruption of the outflow of the chip by the grooving cutting work or the like. In addition, since the clamp mechanism in the present invention can sufficiently resist a force in a direction of pulling out the cutting insert, the positional accuracy of the tool cutting edge in the cutting insert can be maintained over a long period of time. Accordingly, a tool life of the cutting insert or the cutting tool can be extended.

BRIEF DESCRIPTION OF DRAWINGS

FIG. 1 is a perspective view of a cutting tool according to a first embodiment;
FIG. 2 is a plan view of the cutting tool shown in FIG. 1.

DESCRIPTION OF EMBODIMENTS

An explanation will be made of embodiments in the present invention with reference to the drawings.

Figure 3A:
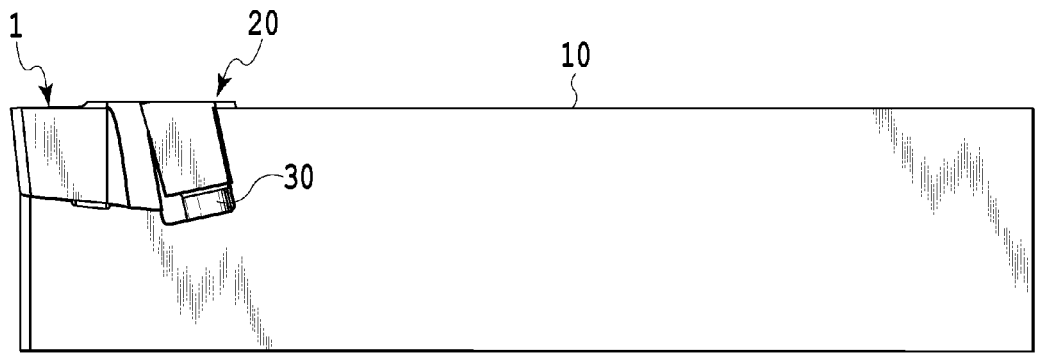
FIG. 3A is a front view of the cutting tool shown in FIG. 1.
Figure 5:
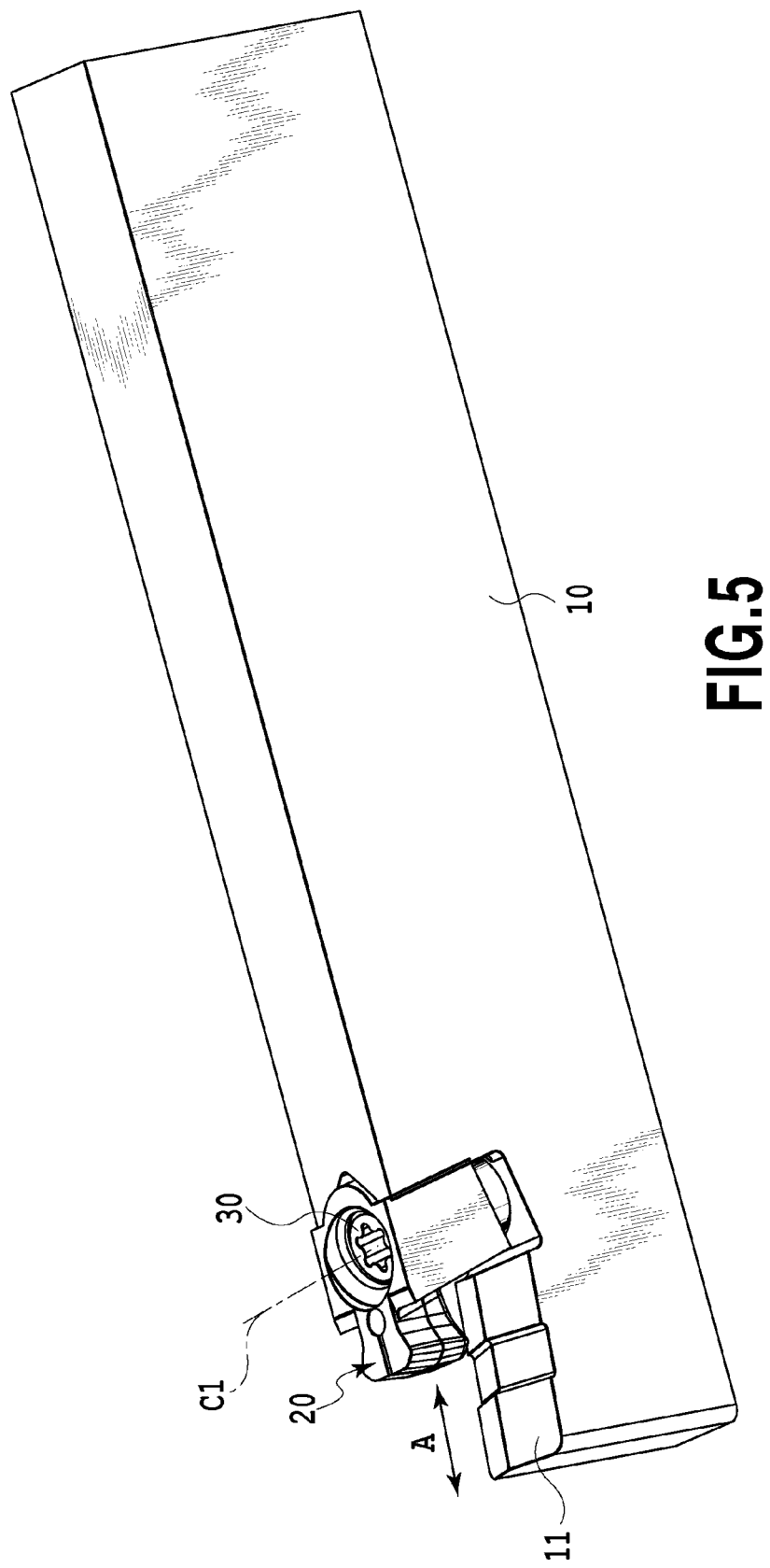
FIG. 5 is a perspective view showing the cutting tool in a state where a cutting insert is removed from the cutting tool in FIG. 1.

As shown in FIG. 1 and FIG. 5, a clamp mechanism in the present embodiment can removably fix a cutting insert 1 to a cutting tool 10. This clamp mechanism uses a clamp member 20 and a screw member 30. The clamp member 20 is driven by the screw member 30 to move forward/backward in a direction of a rotating axis C1 of the screw member 30, thus restraining the cutting insert 1 in that direction (therefore, the restraining direction of the cutting insert 1 is hereinafter referred to as "restraining direction C1" as needed). After the assembly, no component projects upward over an upper surface (upper side in FIG. 3A) of the cutting insert 1 at all. In other words, any of the clamp member 20 and the screw member 30 does not project upward over the upper surface of the cutting insert 1.

Figure 18:
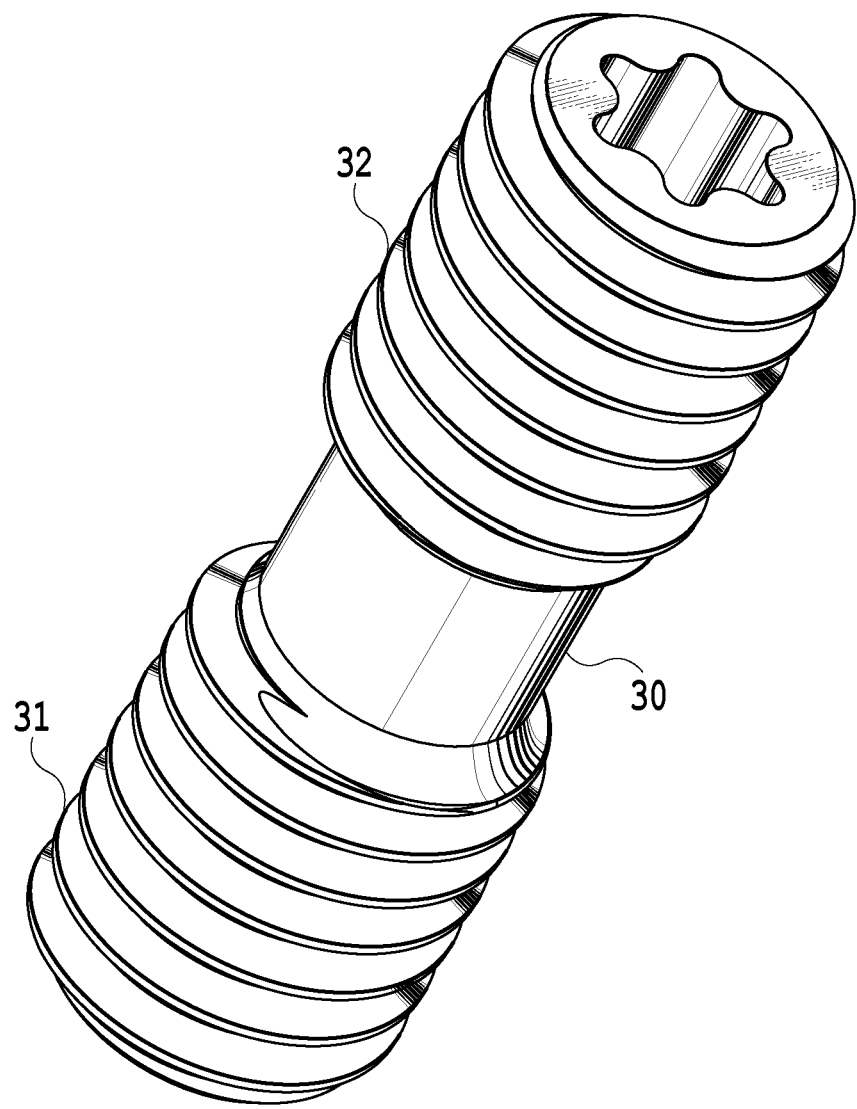
FIG. 18 is a perspective view of a screw member according to a first embodiment.
Figure 19:
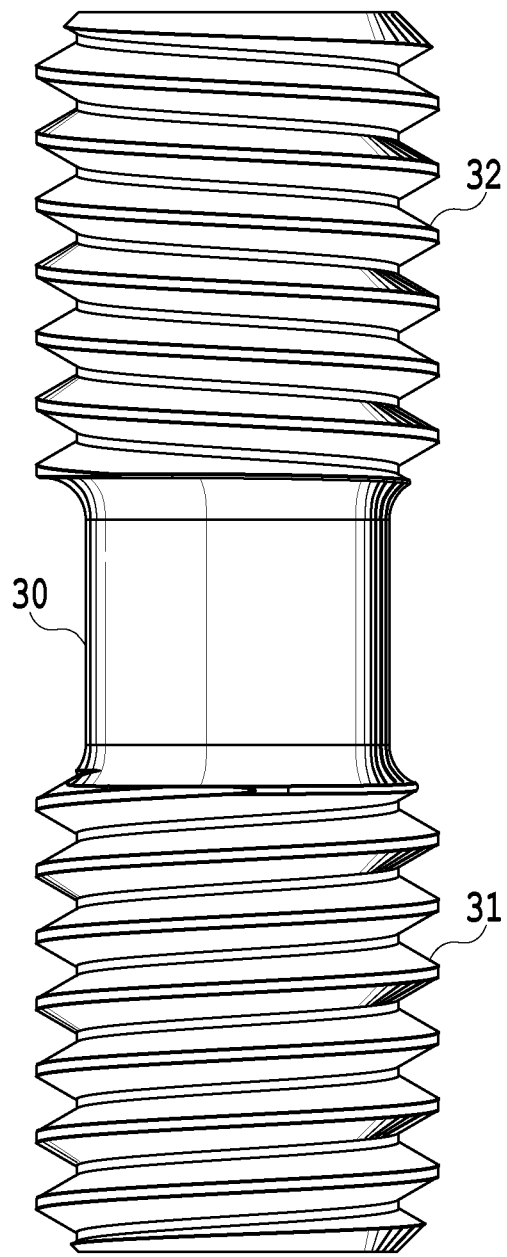
FIG. 19 is a front view of the screw member shown in FIG. 18.

As shown in FIG. 20 to FIG. 23, a screw hole 13 into which a first screw portion 31 of the screw member 30 is threaded is disposed near a chip seat 14 of the cutting tool 10. As shown in FIG. 12 to FIG. 17, the clamp member 20 includes a second screw hole 26 having a left-hand screw (reverse screw). Correspondingly to this, as shown in FIG. 18 and FIG. 19, the screw member 30 includes a second screw portion 32 threaded into the second screw hole 26.

When such clamp member 20 and screw member 30 are used, a rotary operation of the screw member 30 enables the clamp member 20 to move at twice as many as a regular speed. In other words, as compared to a regular screw member having the same pitch, a rotational angle of the screw member 30 necessary for moving the clamp member 20 by the same distance can be made to the half. It should be noted that each of the screw member 30 and the clamp member 20 does not necessarily need a left-hand screw section. The screw member 30 and the clamp member 20 are only required to be structured such that the clamp member 20 is movable forward/backward in association with a forward/backward operation of the screw member 30 by contact between the screw member 30 and the clamp member 20. That is, a configuration of a contacting section between the screw member 30 and the clamp member 20 is not limited to the left-hand screw as in the case of the present embodiment. For example, a small screw with an enlarged head portion as the screw member 30 may be used to provide the clamp member 20 with a seat corresponding to the head portion of the small screw.

Figure 6:
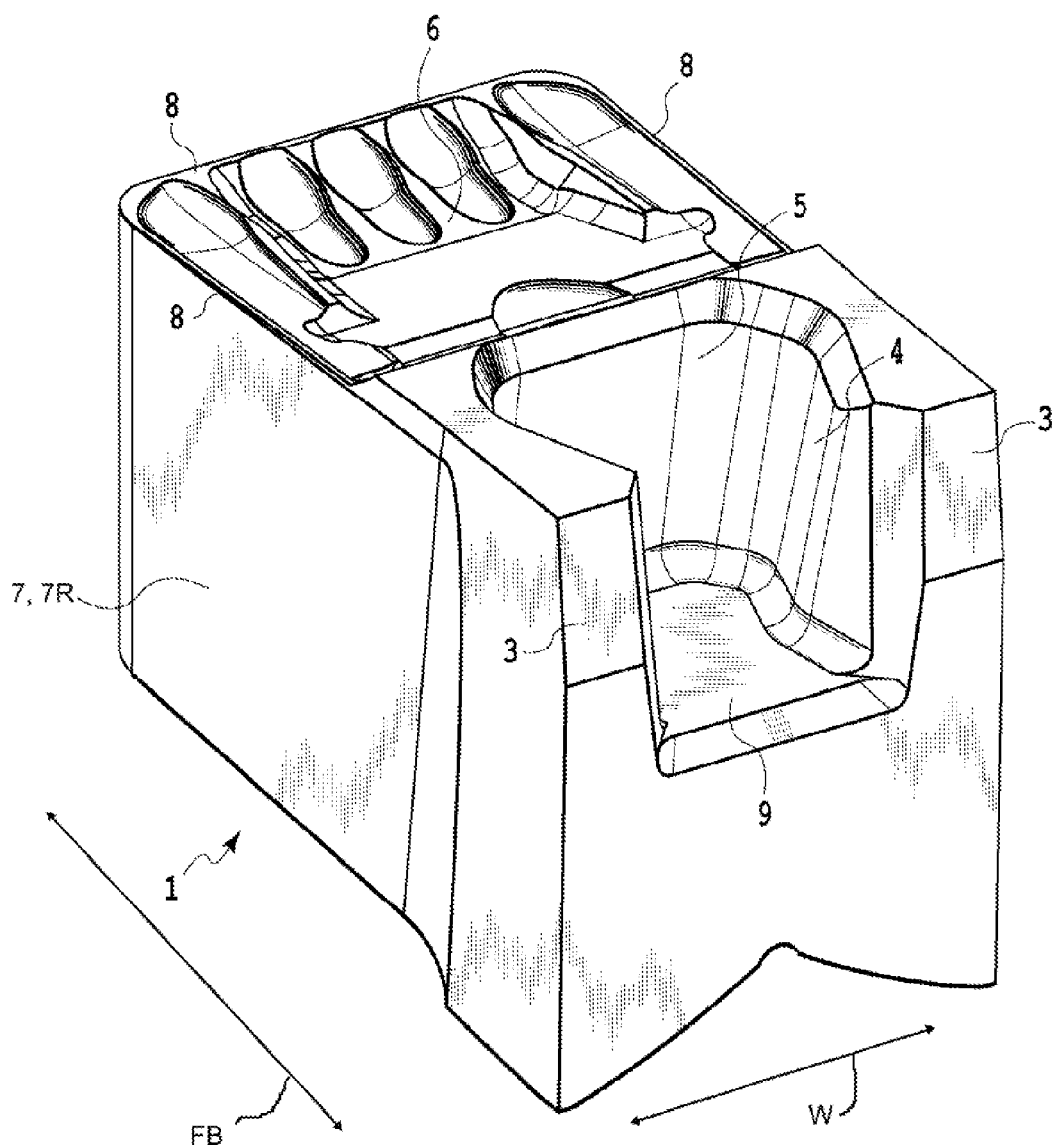
FIG. 6 is a perspective view of a cutting insert according to a first embodiment.
Figure 11:
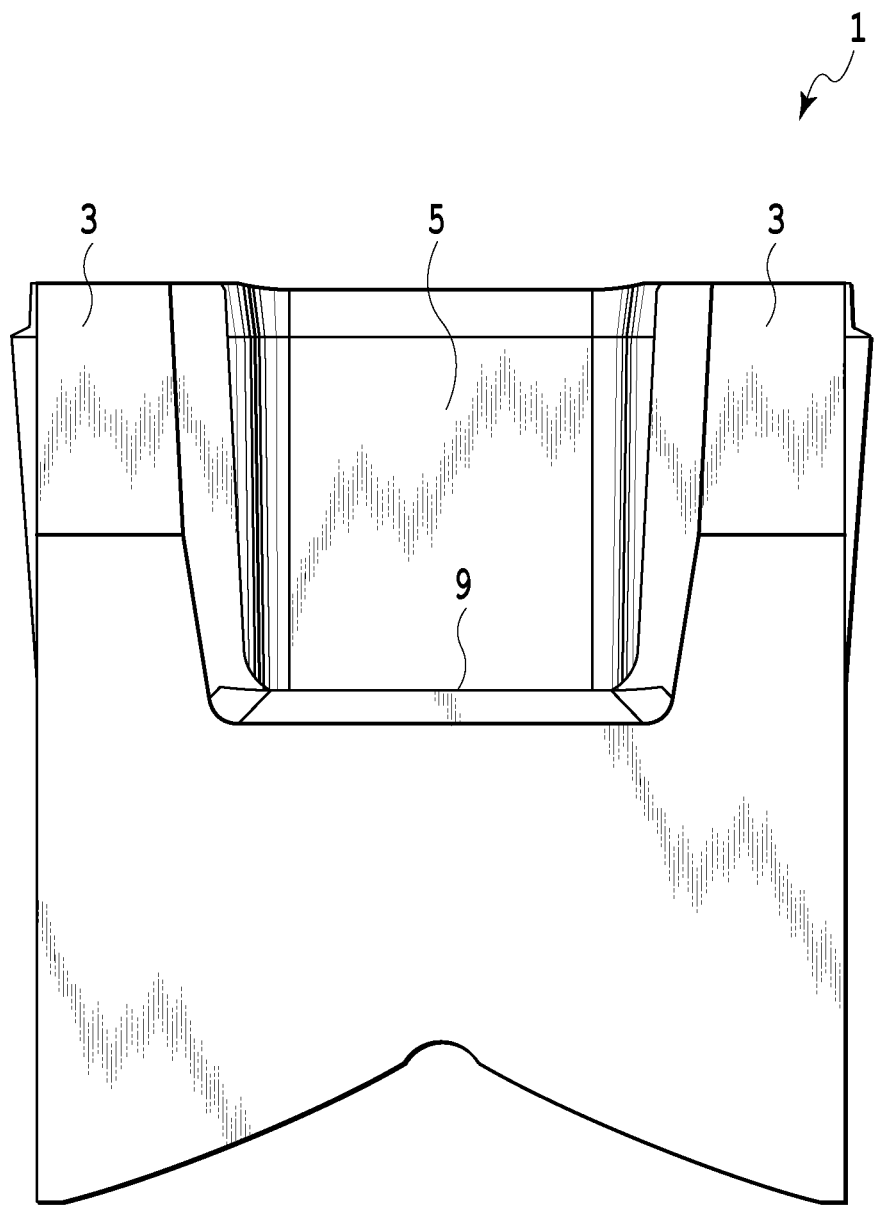
FIG. 11 is a rear elevation of the cutting insert shown in FIG. 6.

The cutting insert 1 in the present embodiment is, as shown in FIG. 1, and FIG. 6 to in FIG. 11, a cutting insert 5 that is formed in a substantially square shape in a plan view and is adapted to be used in a grooving or cut-off work. The cutting insert 1 is provided with a cutting edge at least one side thereof. In the present embodiment, a cutting edge 8 is formed on an intersection ridge line between a rake face 6 forming an upper face and a flank 7 of a side face. The flank 7 comprises a forward surface 7F, a right side surface 7R and a left side surface 7L, the right and left side surfaces being spaced apart from one another along a width direction W of the insert. The cutting edge 8 is structured to be successive in three directions of a front side, a right side, and a left side. A traverse work is made possible in addition to the grooving work and the shearing work by the cutting edge 8 successive in the three directions.

As shown in FIG. 20 to FIG. 23, the cutting tool 10 is provided with a first guide face 11 for guiding the cutting insert 1 in a predetermined guide direction A. The guide direction A is approximately a front-back direction, that is, a longitudinal direction of the cutting tool 10 (that is, right-left direction in FIG. 21). The guide direction A is not in parallel to the restraining direction C1 of the cutting insert 1. The first guide face 11 comprises four guide face sections 11a, 11b, 11c and 11d. A cross sectional configuration of the first guide face 11 is formed in a mountain shape. That is, the first guide face 11 is preferably formed as a planar configuration generated by sweeping a vertical plane in the mountain shape in a substantially front-back direction. A ridge line corresponding to a peak of the mountain shape is formed in the first guide face 11. The direction of sweeping the mountain shape is made to a direction inclined relative to the front-back direction in a side view. This sweeping direction forms the guide direction A (refer to FIG. 5) for guiding the cutting insert 1. The first guide face 11 approaches a lower surface of the cutting tool 10 as it goes closer to the backside of the cutting tool 10. This inclination acts to cause a direction of pushing the cutting insert 1 downward and backward when a cutting force acts on the cutting edge 8 at the front end to be the same as a direction of a push force when the cutting insert 1 is attached.

Figure 20:
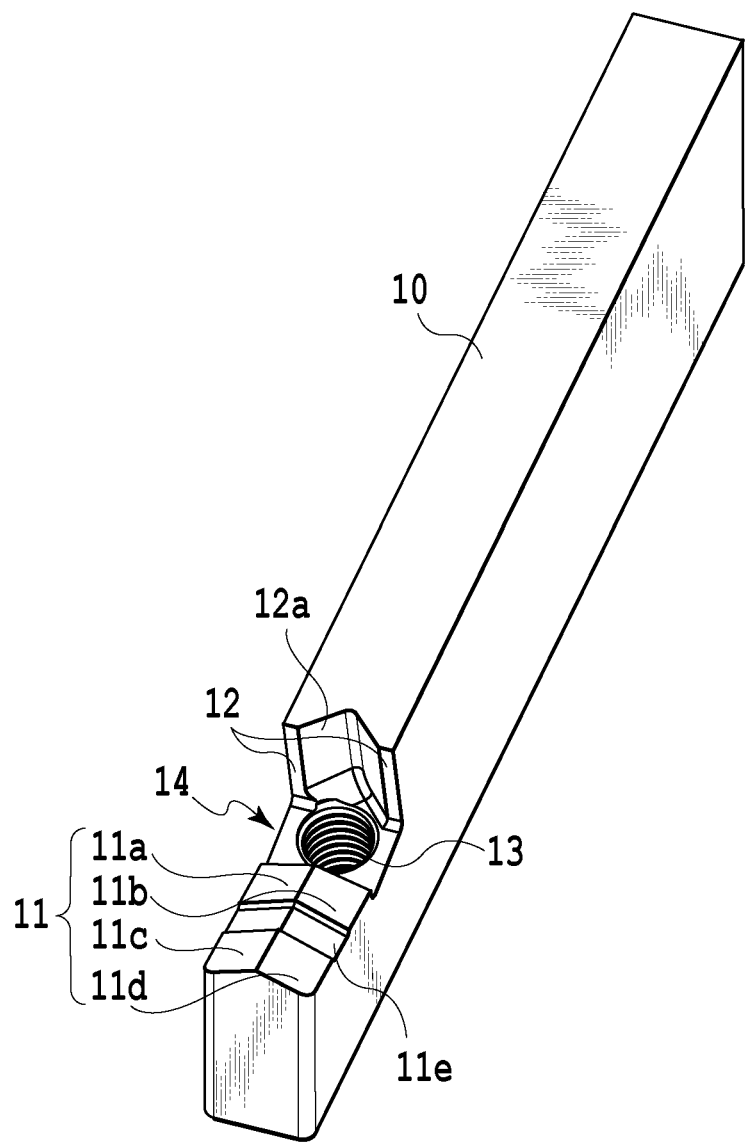
FIG. 20 is a perspective view showing a state where each component of the cutting tool according to the first embodiment is removed.

A concave portion 11e that does not abut the cutting insert 1 is provided in the halfway part of the first guide face 11 (refer to FIG. 20). This serves to facilitate close contact between the first guide face 11 and the cutting insert 1 in the vicinity of the front and back ends of the first guide face 11. It should be noted that this concave portion 11e is not always necessary.

Figure 9:
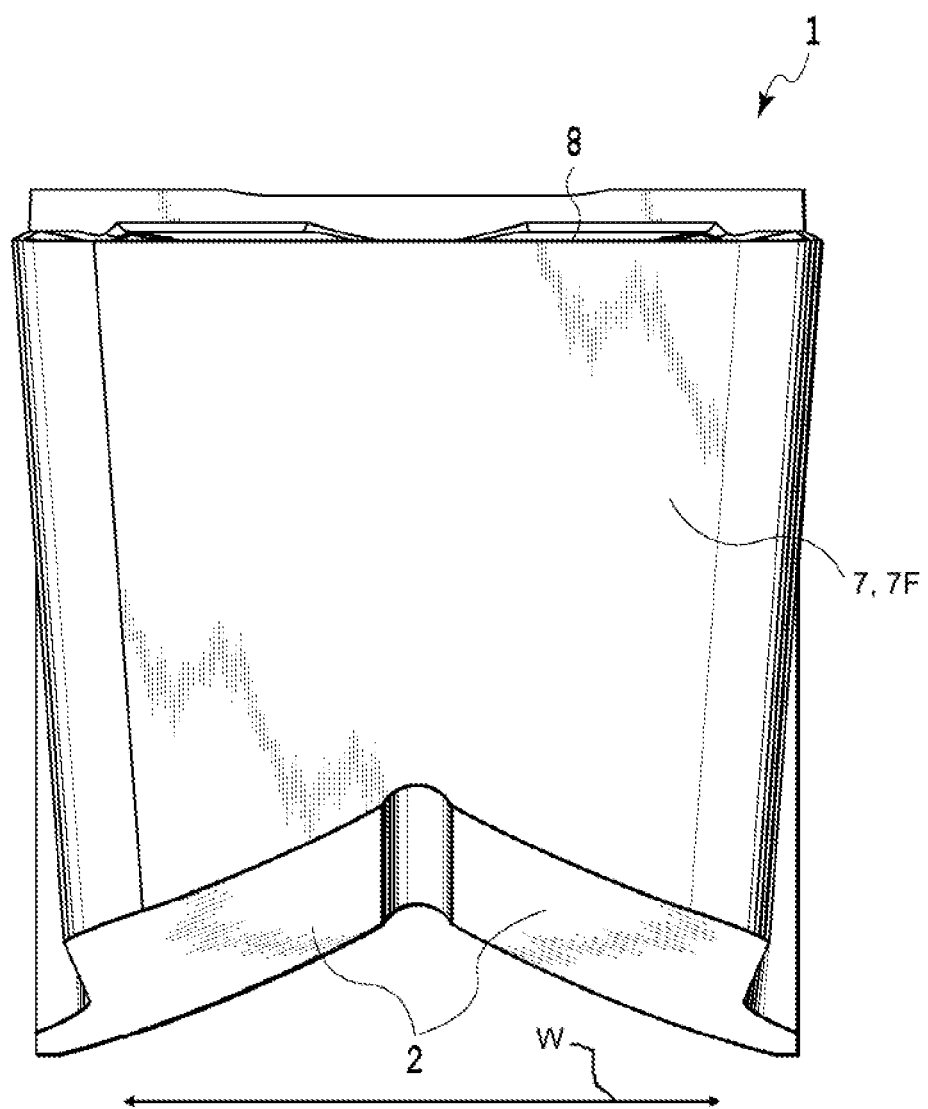
FIG. 9 is a front view of the cutting insert shown in FIG. 6.
Figure 10:
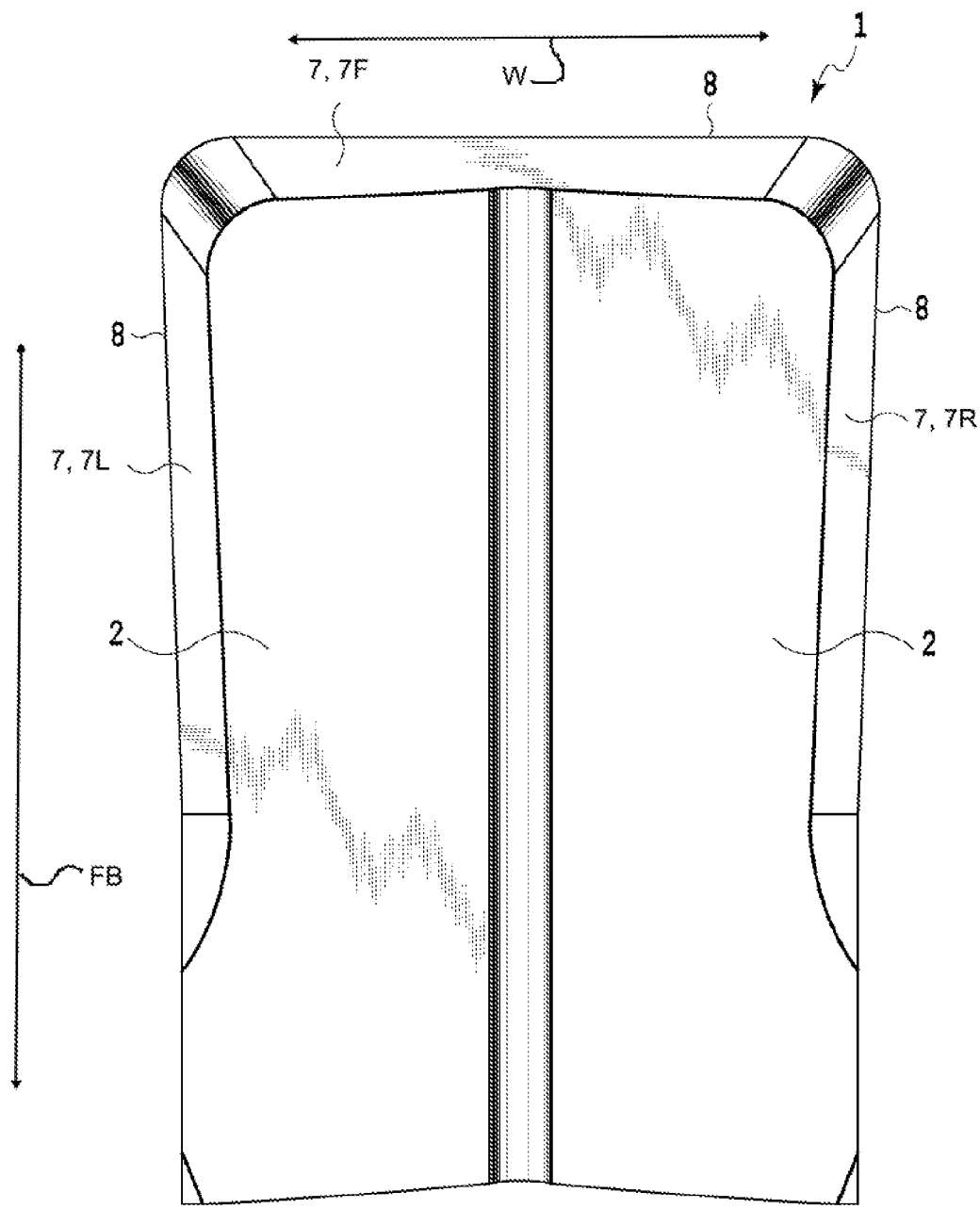
FIG. 10 is a bottom view of the cutting insert shown in FIG. 6.

As shown in FIG. 9 and in FIG. 10, the cutting insert 1 is provided with a seating face 2 for abutting the first guide face 11 of the cutting tool 10. The seating face 2 extends between the insert's forward surface 7F and the insert's rear surface 16, which are spaced apart from one another along a front-back direction FB. A cross sectional configuration of the seating face 2 is a valley shape corresponding to the mountain shape of the first guide face 11 of the cutting tool 10. The seating face 2 is preferably made to a planar configuration formed by sweeping the vertical plane of the valley configuration in the front-back direction FB. A valley corresponding to a bottom of the valley shape is formed in the seating face 2. When the first guide face 11 having the cross sectional configuration of the mountain shape provided in the cutting tool 10 and the seating face 2 having the cross sectional configuration of the valley shape provided in the cutting insert 1 abut each other, the movement of the cutting insert 1 in the right-left direction is suppressed to guide the cutting insert 1 to slide only in the guide direction A that is approximately the front-back direction FB.

It should be noted that each of the first guide face 11 and the seating face 2 is not limited to the configuration in the present embodiment. Any configuration may be adopted as long as the cross sectional configuration is such a configuration as to be able to limit the sliding direction of the cutting insert 1. For example, the cross sectional configuration may be a serration configuration in which mountain shapes and valley shapes are alternately arranged. In addition, a guide face having a cross sectional configuration of a valley shape may be provided in the cutting tool 10, and a seating face having a cross sectional configuration of a mountain shape may be provided in the cutting insert 1. It should be noted that it is preferable to form the seating face 2 on the cutting insert 1 at a reverse side to the rake face 6. It is preferable for the guide direction A to intersect with the restraining direction C1 of the cutting insert 1, but an extension face of the first guide face 11 in the longitudinal direction and the rotating axis C1 of the screw member 30 may have a relationship of a so-called "torsion" without intersecting with each other.

Figure 21:
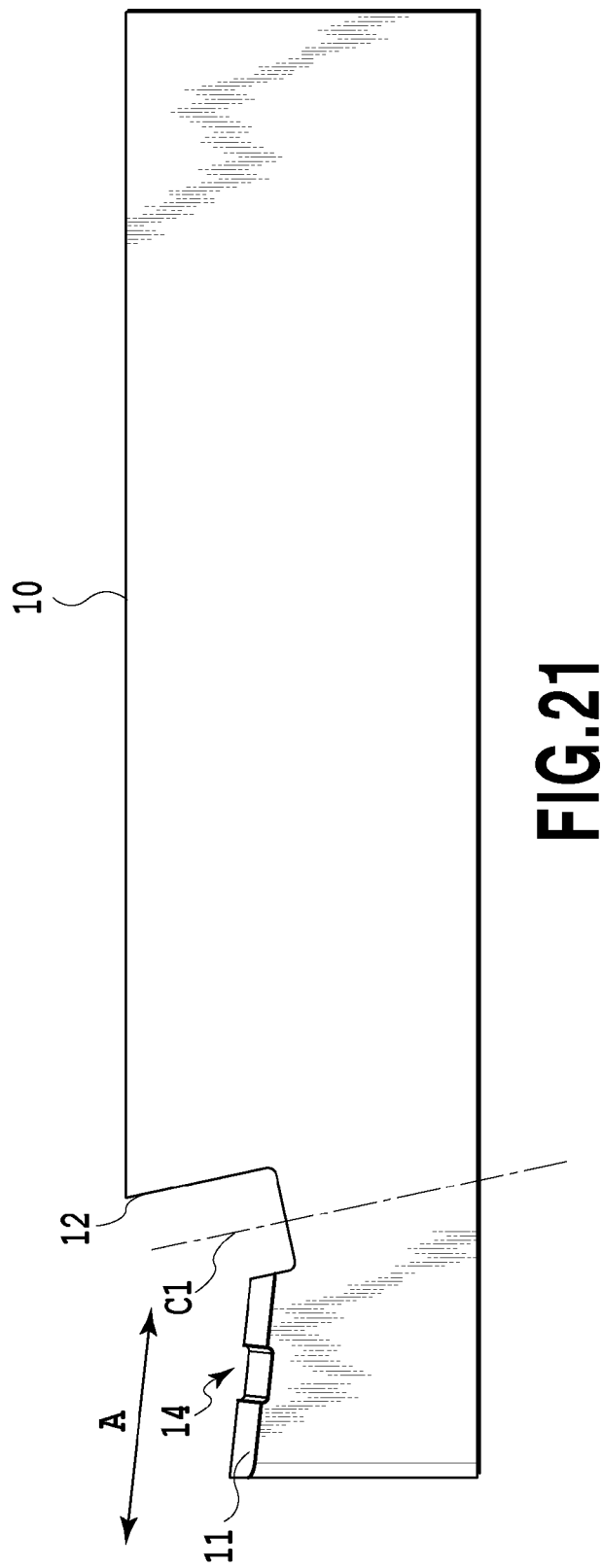
FIG. 21 is a right side view of the cutting tool shown in FIG. 17.
Figure 22:
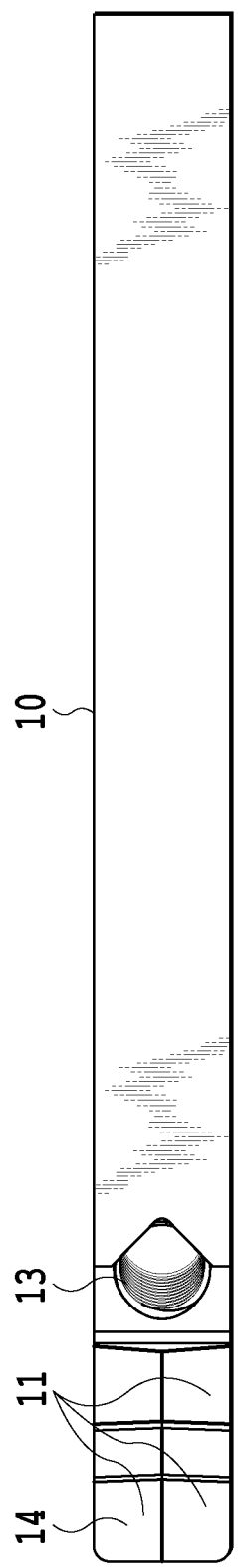
FIG. 22 is a plan view of the cutting tool shown in FIG. 17.
Figure 23:
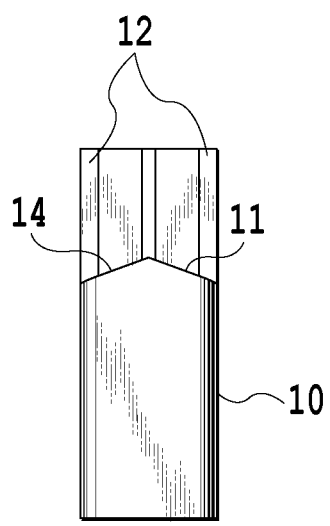
FIG. 23 is a front view showing the cutting tool in FIG. 17.

As shown in FIGS. 20, 21 and 23, the cutting tool 10 is provided with a pair of second flat guide faces 12 for guiding the clamp member 20. The second guide face 12 is inclined relative to the first guide face 11, and is not in parallel to or vertical to the first guide face 11. The second guide face 12 forms a sharp angle as an interior angle to the first guide face 11. As shown in FIG. 21, in the present embodiment, the second guide face 12 is also not vertical to the longitudinal direction of the cutting tool 10. As in detail explained later, the clamping rigidity is reinforced by this inclination.

As shown in FIG. 21, an extending direction of the second guide face 12 is in parallel to a center axis line C1 of the screw hole 13. With this arrangement, the forward/backward direction of the screw portion 30 is in accordance with a direction of being guided by the second guide face 12 to allow the clamp member 20 to smoothly slide. However, the extending direction of the second guide face 12 may be inclined slightly from the same direction as the center axis line C1 of the screw hole 13 in a range where the clamp member 20 can smoothly slide. In this case, it is preferable to incline the second guide face 12 in such a direction that the clamp member 20 is pushed against the second guide face 12 at the time of fastening the clamp member 20.

As shown in FIG. 12 to FIG. 17, the clamp member 20 is provided with two flat sliding faces 21 for abutting the two second guide faces 12 of the cutting tool 10. The second guide face 12 and the sliding face 21 abut both ends of the cutting tool 10 in the right and left. A valley-shaped concave portion 12a is disposed between the two second guide faces 12 of the cutting tool 10 (refer to FIG. 20), and a plug element 21a in a substantially semi-columnar shape is disposed between the two sliding faces 21 of the clamp member 20. After assembly, an appropriate gap is formed between the valley-shaped concave portion 12a and the plug element 21a. That is, a position in a lateral direction (width direction of the cutting tool 10) of the clamp member 20 is not determined by the valley-shaped concave portion 12a or the plug element 21a. The valley-shaped concave portion 12a and the plug element 21a enable the clamp member 20 to be positioned roughly to the cutting tool 10. The position of the clamp member 20 in the lateral direction is determined depending on a position in a lateral direction of the cutting insert 1.

It is effective to provide the second guide faces 12 and the sliding faces 21 at both the ends in the lateral direction for suppressing the movement of the cutting insert 1 during cutting. This is because the cutting force can be supported by two faces having a relatively wide interval therebetween. Since each of the second guide face 12 and the sliding face 21 is formed of a plane, it is easy to produce them. However, each of the second guide face 12 and the sliding face 21 is not limited to the configuration in the present embodiment, but at least one of both the faces may be formed as a concave/convex face. In this case, accuracy in a relative position between the cutting tool 10 and the clamp member 20 in the lateral direction can further be improved.

A relative movement of the clamp member 20 to the cutting tool 10 in the guide direction A is limited by the screw member 30. It should be noted that, for limiting or suppressing the movement of the clamp member 20 in the escape direction from the cutting tool 10, an element for establishing engagement between the clamp member 20 and the cutting tool 10 may be provided in at least one of them.

As shown in FIG. 6, the cutting insert 1 is provided with a single concave portion 5 in a backward shoulder portion of an upper surface thereof. The cutting insert 1 is provided with first abutment surfaces 3 on a rear surface thereof for abutting the clamp member 20. The concave portion 5 includes a bottom surface 9. As shown in the plan view of FIG. 7, the concave portion 5 also includes, a swollen section 5a having a first dimension W1 in the insert's width direction W and a narrow section 5b disposed in an area closer to the first abutment surface 3 than the swollen section 5a and having a second dimension W2 in the insert's width direction W, the second dimension W2 being smaller than the first dimension W1. In more detail, the concave portion 5 includes, in at least any cross section parallel to the guide direction A shown in FIG. 3B, for example, in a cross section taken along line D-D, the swollen section 5a having the first dimension in the width direction, and the narrow section 5b disposed in the area closer to the first abutment surface 3 than the swollen section 5a and having the second dimension smaller in the width direction than the swollen section 5a.

Figure 7:
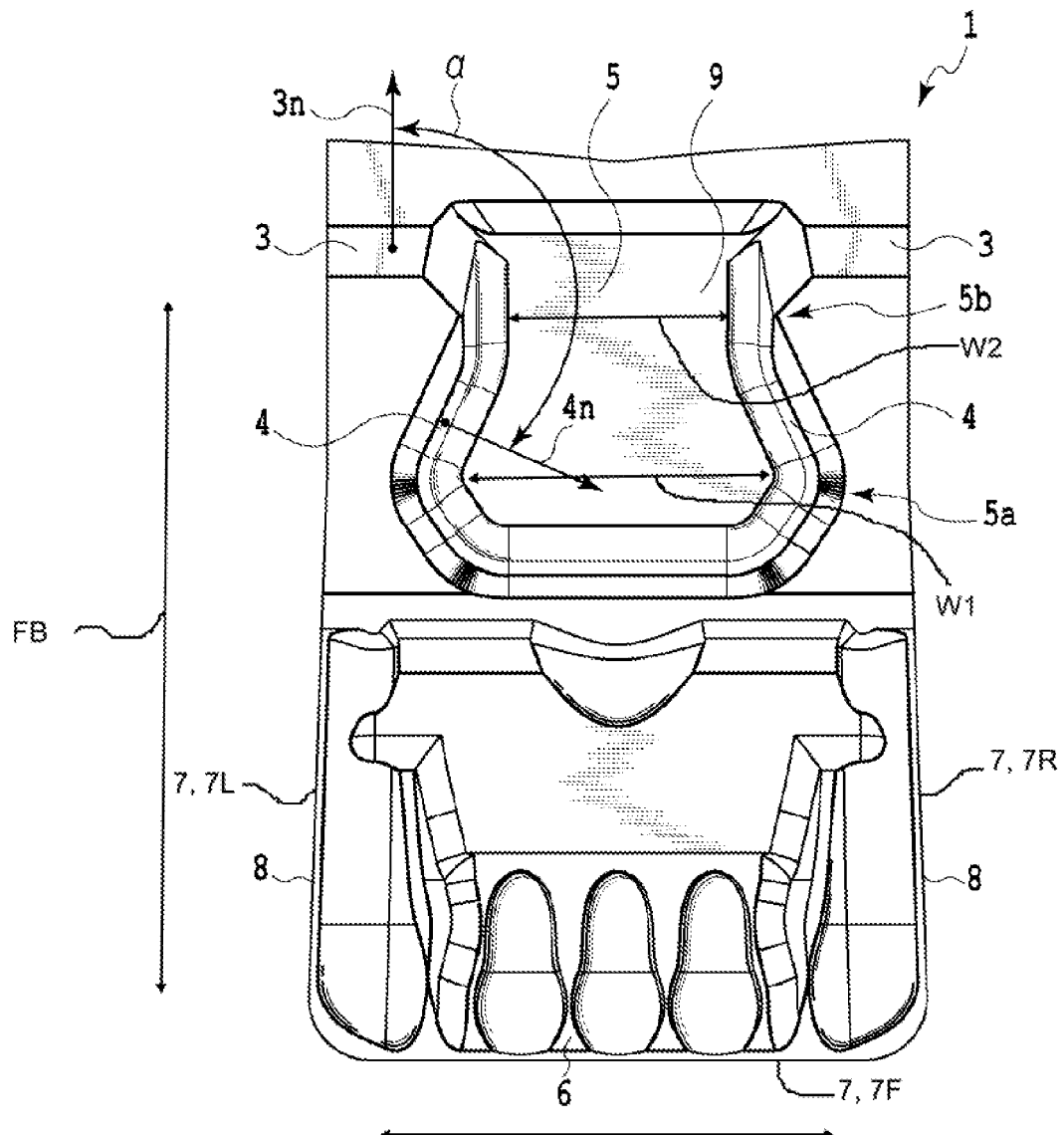
FIG. 7 is a plan view of the cutting insert shown in FIG. 6.

At least a pair of second abutment surfaces 4 are formed in an inner lateral portion of the concave portion 5. The second abutment surfaces 4 are, as shown in FIG. 7, arranged inside the concave portion 5, and are defined as faces directed to the forward side (lower side in FIG. 7) of the cutting insert 1. That is, an interval between the pair of the second abutment surfaces 4 is wider as be away from the first abutment surface 3. At least a part of the concave portion 5 has a width that is larger as be away from the backward side of the cutting insert 1 by being provided with the pair of the second abutment surfaces 4.

Figure 12:
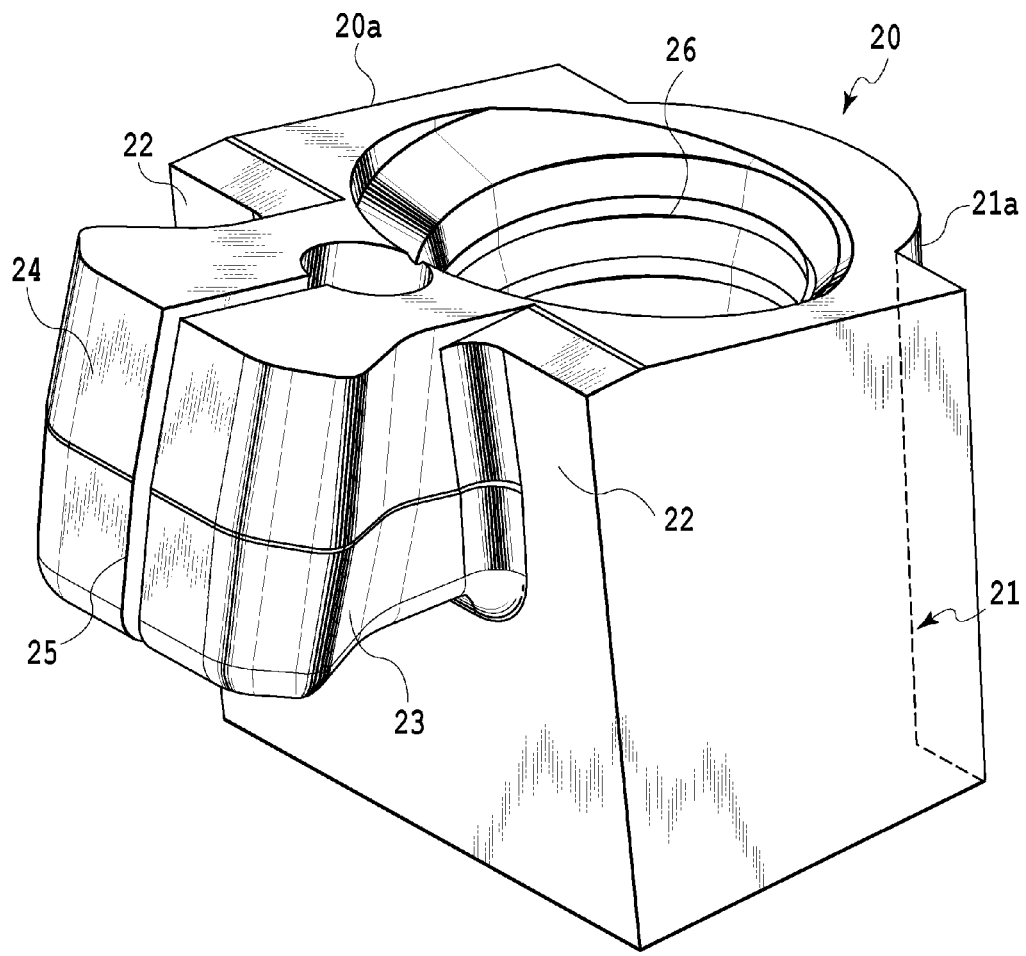
FIG. 12 is a perspective view of a clamp member according to a first embodiment.
Figure 13:
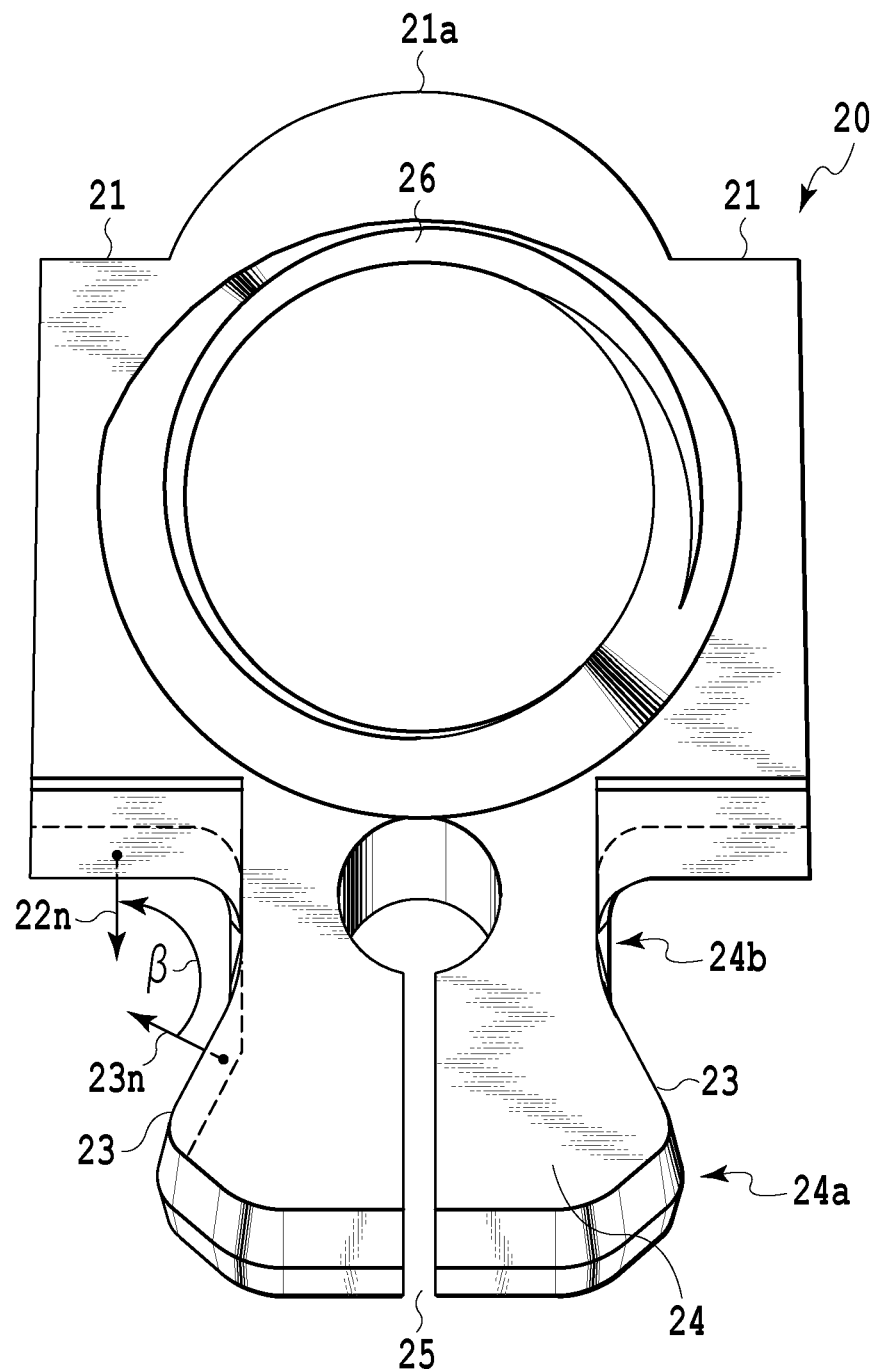
FIG. 13 is a plan view of the clamp member shown in FIG. 11.
Figure 14:
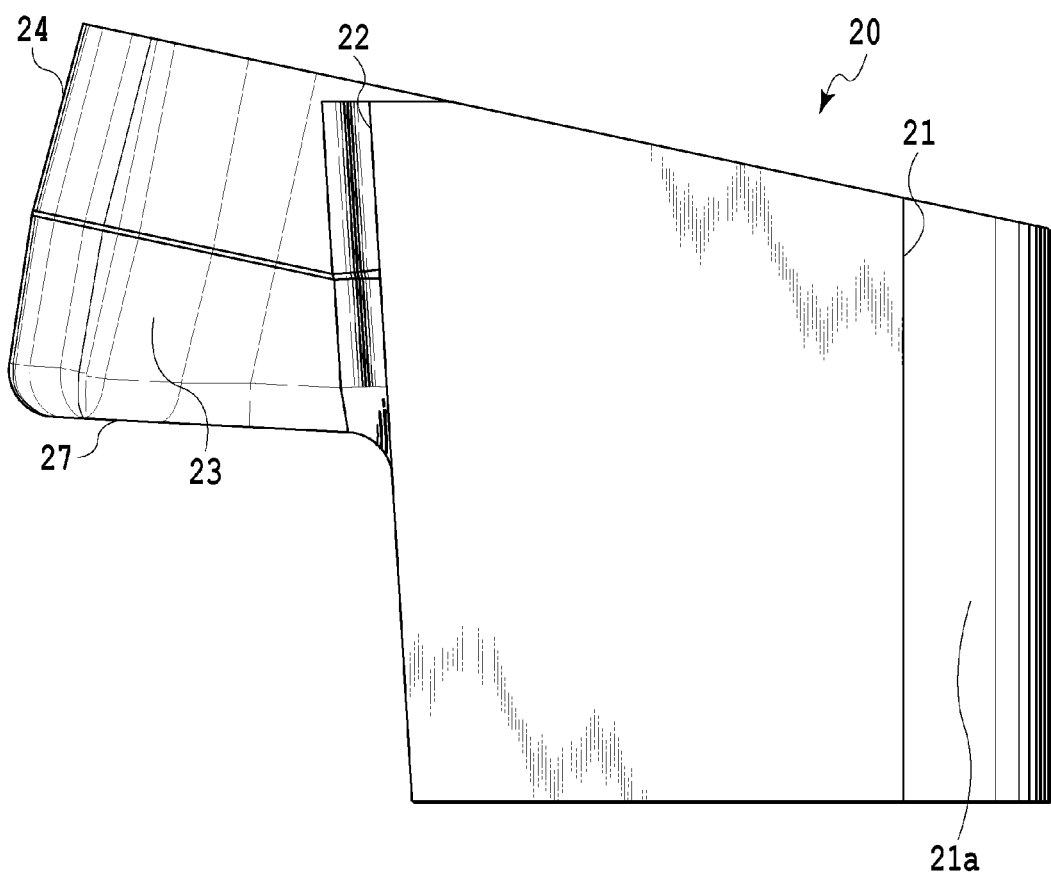
FIG. 14 is a right side view of the clamp member shown in FIG. 11.
Figure 15:
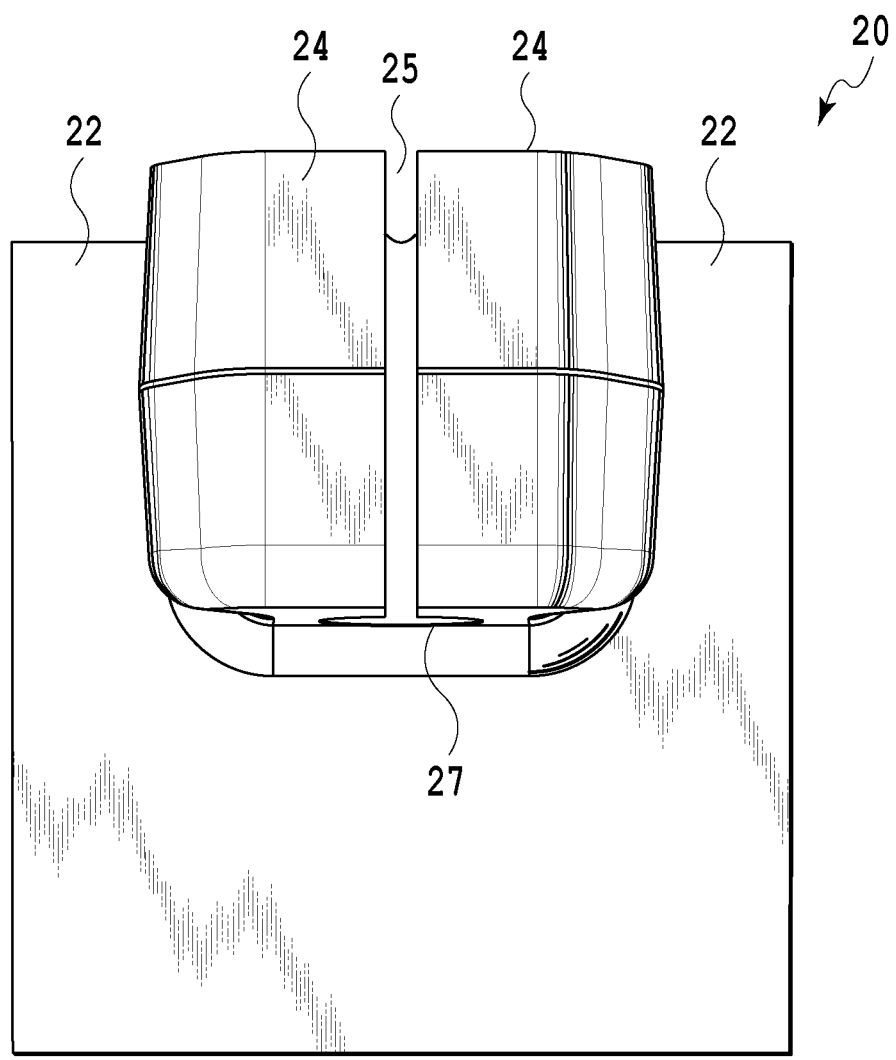
FIG. 15 is a front view of the clamp member shown in FIG. 11.
Figure 16:
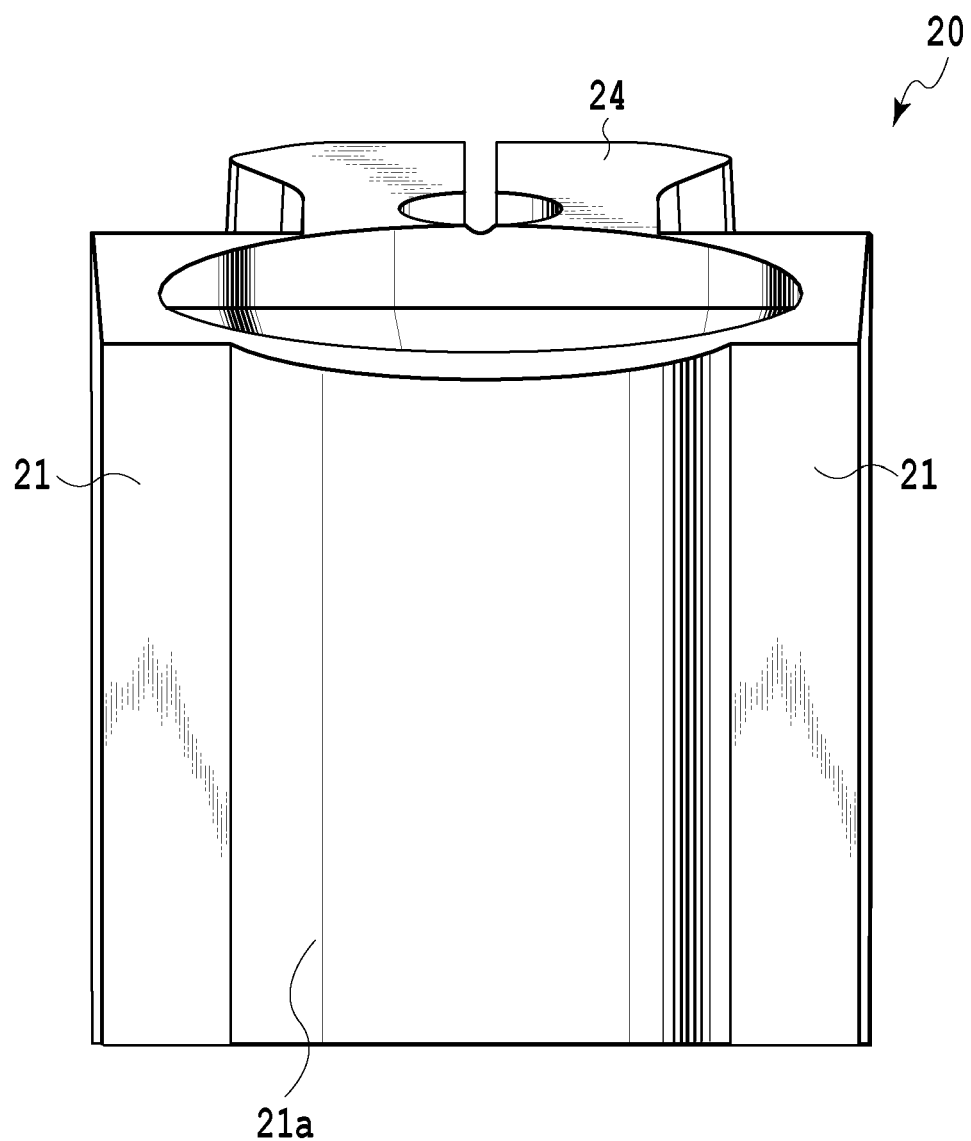
FIG. 16 is a rear elevation of the clamp member shown in FIG. 11.
Figure 17:
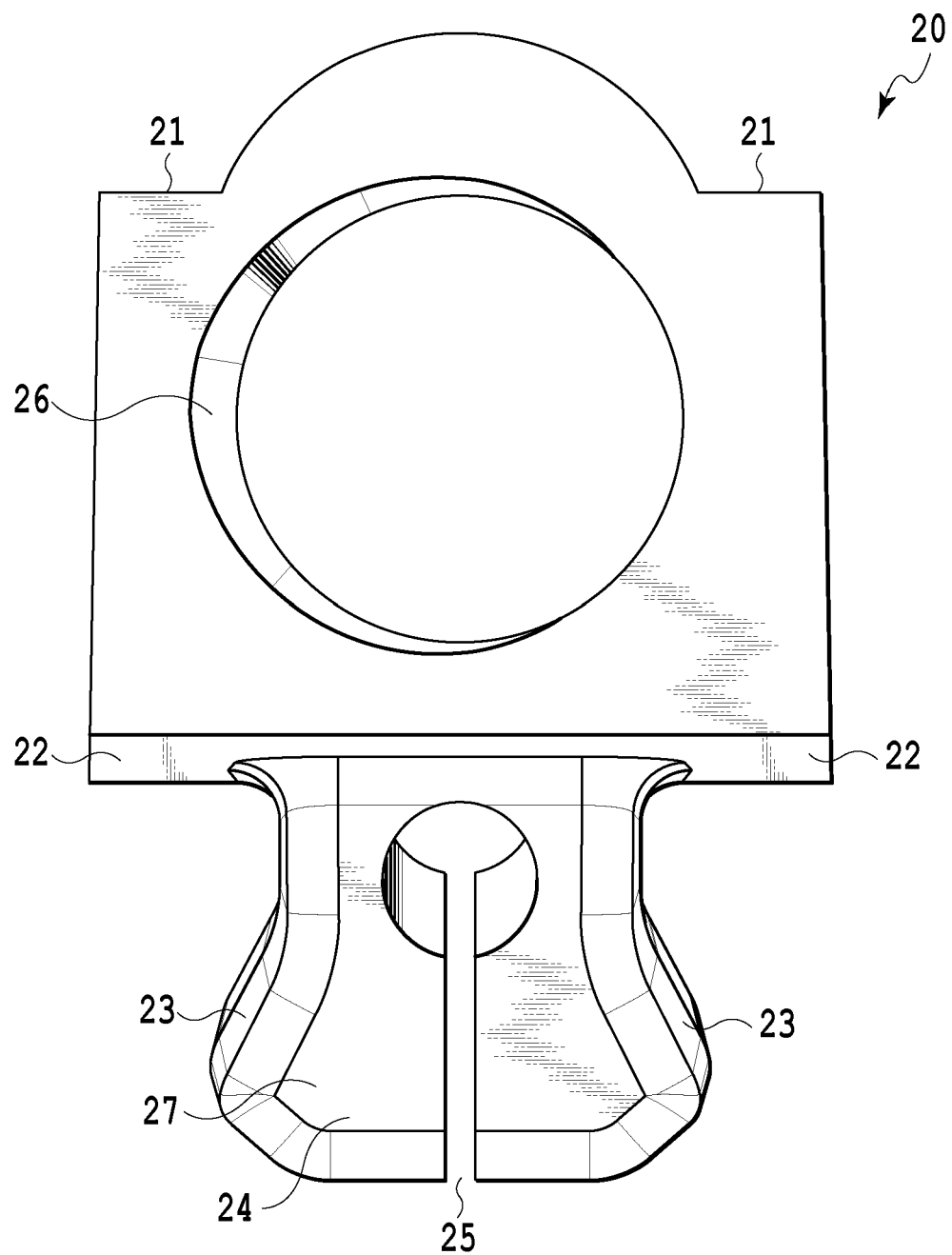
FIG. 17 is a bottom view of the clamp member shown in FIG. 11.

As shown in FIG. 12, the clamp member 20 is provided with a plug element 24 for abutting the concave portion 5 of the cutting insert 1. The plug element 24 extends from a main section 20a that is part of the clamp member 20 other than the plug element 24. As shown in FIG. 13, the plug element 24 includes, as viewed in a direction (C1) in which the clamp member 20 approaches the cutting tool 10, a swollen section 24a having a first dimension in the width direction, and a narrow section 24b disposed in an area closer to the main section 20a than the swollen section 24a and having a second dimension smaller in the width direction than the swollen section 24a. In more detail, the plug element 24 includes, in any cross section parallel to the guide direction A shown in FIG. 3B, for example, in a cross section taken along line D-D, the swollen section 24a having the first dimension in the width direction and the narrow section 24b disposed in the area closer to the main section 20a than the swollen section 24a and having the second dimension smaller in the width direction than the swollen section 24a, as shown in FIG. 3C. The first dimension and the second dimension of the plug element 24 are respectively smaller than the first dimension and the second dimension of the concave portion 5.

The plug element 24 includes at least a pair of fourth abutment surfaces 23. The second abutment surface 4 is, as shown in FIG. 13, is defined as a face directed to the backward side (upper side in FIG. 13) of the clamp member 20. That is, an interval between the pair of the fourth abutment surfaces 23 is wider as be away from the third abutment surface 22. At least a part of the plug element 24 has a width that is larger as being away from the third abutment surface 22 by being provided with the pair of the third abutment surfaces 22. It should be noted that "main section" in the specification is a section of the first member other than the plug element, and a relative size of the main section may be larger or smaller as compared to the plug element.

The plug element 24 and the concave portion 5 provide such an anti-escape structure as to allow a relative movement of the clamp member 20 in a direction of being away from the first guide face 11 and suppress separation of the cutting insert 1 in the guide direction A from the clamp member 20. It should be noted that in reverse to the present embodiment, the plug element may be formed in the cutting insert 1, and the concave portion may be formed in the clamp member 20. Similarly in this case, it is preferable that each of the plug element and the concave portion has a section a width of which is larger as being away from the major part (that is, a section of the cutting insert 1 from which the plug element is removed) of the cutting insert 1.

At the time of fixing the cutting insert 1, at least two types of abutment are provided between the cutting insert 1 and the clamp member 20. The first type of abutment is provided between the first abutment surface 11 of the cutting insert 1 and the third abutment surface 22 of the clamp member 20. The first abutment surface 3 is inclined relative to the seating face 2. Therefore, the first abutment surface 3 and the third abutment surface 22 support primarily a backward component force among cutting forces that the cutting insert 1 receives during cutting. That is, the third abutment surface 22 suppresses the movement of the cutting insert 1 in the front-back direction. As described above, the second guide face 12 guides the clamp member 20 in a direction of being inclined relative to the first guide face 11. The third abutment surface 22 of the clamp member 20 is also inclined relative to the first abutment surface 11. Due to this inclination, when the cutting force acts on the cutting edge 8 at the front end, the cutting insert 1 is pushed downward and backward, and the first abutment surface 3 is pushed against the third abutment surface 3 at the backward side.

The third abutment surface 22 forms a sharp angle as an interior angle toward the first guide face 11. Therefore, a reaction in the longitudinal direction that the cutting insert 1 receives from the third abutment surface 22 acts in a direction of pushing the cutting insert 1 downward on the first guide face 11. Accordingly, it is possible to suppress lifting-up of the cutting insert 1 to increase the clamping rigidity, thus performing the stable cutting work. In addition, since the inclination of the first abutment surface 11 can resist the force of pulling out the cutting insert 1 forward, the clamping rigidity is further increased.

The second type of abutment is, as described above, provided between the concave portion 5 of the cutting insert 1 and the plug element 24 of the clamp member 20. The pair of the second abutment surfaces 4 provided in the concave portion 5 of the cutting insert 1 abut the pair of the fourth abutment surfaces 23 provided in the plug element 24 of the clamp member 20.

In a plan view or as viewed in a direction (C1) of approaching the cutting tool 10, as shown in FIG. 7, an angle α between a normal line 3*n* of the first abutment surface 3 and a normal line 4*n* of the second abutment surface 4 in the cutting insert 1 exceeds 90 degrees. In more detail, in any cross section parallel to the guide direction A shown in FIG. 3B, for example, in a D-D cross section, the angle α between the normal line 3*n* of the abutment surface 3 and the normal line 4*n* of the second abutment surface 4 in the cutting insert 1 exceeds 90 degrees. In other words, the second abutment surface 4 is directed at least partially in a direction in reverse to the first abutment surface 3 to be opposed to each other. In a fastened state, the normal line 3*n* of the abutment surface 3 is directed to the backward side of the cutting tool 10, and the normal line 4*n* of the second abutment surface 4 is directed to the forward side of the cutting tool 10.

Similarly, in a plan view or as viewed in a direction (C1) of approaching the cutting tool 10, as shown in FIG. 13, an angle β between a normal line 22*n* of the third abutment surface 22 and a normal line 23*n* of the fourth abutment surface 23 in the clamp member 20 exceeds 90°. In more detail, in any cross section parallel to the guide direction A shown in FIG. 3B, for example, in a D-D cross section, the angle β between the normal line 22*n* of the third abutment surface 22 and the normal line 23*n* of the fourth abutment surface 23 in the cutting insert 1 exceeds 90 degrees. In other words, the fourth abutment surface 23 is directed at least partially in a direction in reverse to, and also faces, the third abutment surface 22. In a fastened state, the normal line 22*n* of the third abutment surface 22 is directed to the forward side of the cutting tool 10, and the normal line 23*n* of the fourth abutment surface 23 is directed to the backward side of the cutting tool 10. In this way, any of the angle α between the normal line 3*n* and the normal line 4*n* and the angle β between the normal line 22*n* and the normal line 23*n* exceeds 90 degrees, which can facilitate the fastening between the cutting insert 1 and the clamp member 20.

Figure 3B:
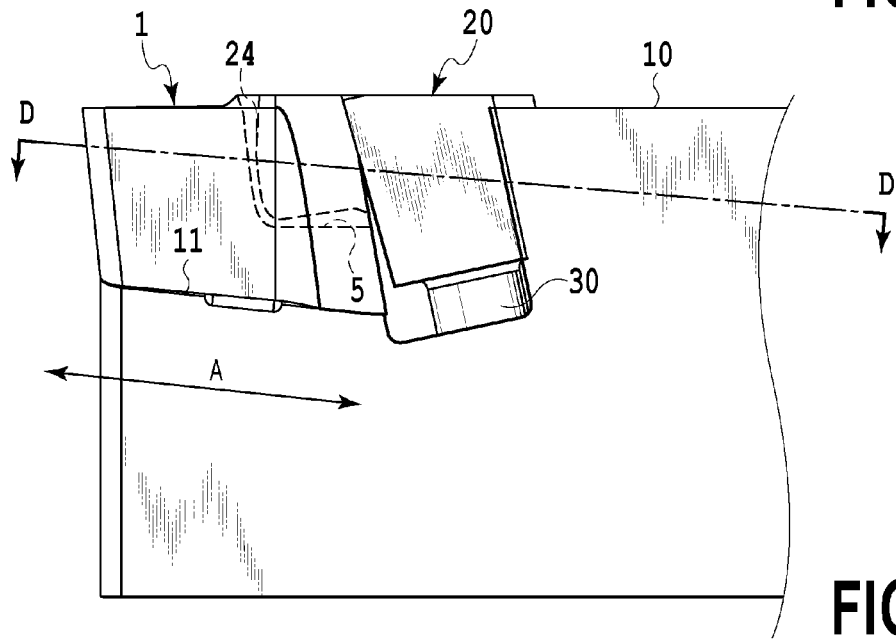
FIG. 3B is a front view showing an essential part of the cutting tool in FIG. 1.
Figure 3C:
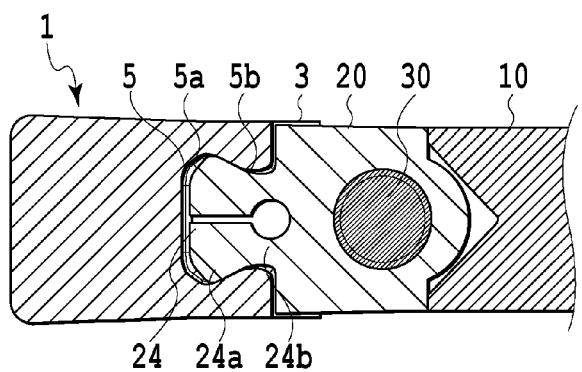
FIG. 3C is a cross section showing the cutting tool in FIG. 1, taken along line D-D in FIG. 1.
Figure 4:
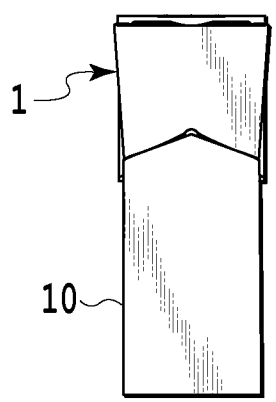
FIG. 4 is a left side view of the cutting tool in FIG. 1.

In at least any cross section parallel to the guide direction A shown in FIG. 3B, for example, in a D-D cross section, the maximum width of the plug element 24 is larger than the minimum interval of the concave portion 5 near an inlet port. This anti-escape structure allows the plug element 24 of the clamp member 20 to interfere with the concave portion 5 of the cutting insert 1, and accordingly, the plug element 24 cannot be pulled out of the concave portion 5 in any of the forward/backward direction (that is, guide direction A) and the lateral side (width direction in a plan view) from a state where the plug element 24 is inserted inside the concave portion 5.

As shown in FIG. 7, the pair of the second abutment surfaces 4 may be formed symmetrically to the right and left. As shown in FIG. 13, the fourth abutment surfaces 23 may also be formed symmetrically to the right and left. When the second abutment surfaces 4 and the fourth abutment surfaces 23 are respectively formed symmetrically to the right and left, rotation of the cutting insert 1 in use in a plan view is suppressed, and the fastening between the cutting insert 1 and the clamp member 20 is furthermore strengthened. However, at least one of the second abutment surfaces 4 and the fourth abutment surfaces 23 may be formed non-symmetrically to the right and left. The second abutment surface 4 and the fourth abutment surface 23 are not required to make surface-contact therebetween, and may make point-contact therebetween. Each of the second abutment surface 4 and the fourth abutment surface 23 is not limited to the plane, but at least one thereof may be a curved face. At least one of the second abutment surfaces 4 and the fourth abutment surfaces 23 may be provided with a plurality of sets, for example, two pairs or more (that is, four abutment surfaces or more).

The plug element 24 of the clamp member 20 may be provided with a feature for facilitating elastic deformation. For example, a slit 25 is suitable as a feature for facilitating the elastic deformation. The slit 25 is formed along a right middle face of the clamp member 20. The slit 25 may be either single or plural. For facilitating the elastic deformation of the plug element 24, the plug element 24 may be formed of a material more susceptible to deformation than the main section of the clamp member 20. When the plug element 24 is thus provided with the feature for facilitating the elastic deformation, the contact between the first abutment surface 3 and the third abutment surface 22, and the contact between the second abutment surface 4 and the fourth abutment surface 23 can be facilitated and can suppress the looseness between the cutting insert 1 and the clamp member 20. That is, in a state where the cutting insert 1 and the clamp member 20 are not assembled, an interval between the pair of the third abutment surfaces 22 and the pair of the fourth abutment surfaces 23 in the clamp member 20 are slightly larger than an interval between the pair of the first abutment surfaces 3 and the pair of the second abutment surfaces 4 in the cutting insert 1. When the cutting insert 1 abuts the clamp member 20, the elastic deformation of the plug element 24 allows the cutting insert 1 and the clamp member 20 to make close contact with each other.

For facilitating the contact between the plug element 24 and the cutting insert 1, the interval between the abutment surfaces 3 and the interval between the abutment surfaces 4 in the cutting insert 1, and/or the interval between the abutment surfaces 22 and the interval between the abutment surfaces 23 in the clamp member 20 may change in a direction in which the sliding face 21 extends. For example, the interval between the pair of the first abutment surfaces 3 and the interval between the pair of the second abutment surfaces 4 may be gradually narrower toward the lower surface. That is, each face section of the first abutment surface 3 and the second abutment surface 4, and the interval between the first abutment surfaces 3 and the interval between the second abutment surfaces 4 may be gradually narrower toward the seating face 2. By doing so, at the time of fastening the clamp member 20, a gap between the second abutment surface 4 and the fourth abutment surface 23 of the clamp member 20 is gradually narrower, and after the contacting of both, a deformation amount of the plug element 24 gradually increases. Therefore, the plug element 24 of the clamp member 20 is easily deformed to make close contact with the cutting insert 1. In reverse, the interval between the pair of the third abutment surfaces 22 and the interval between the pair of the fourth abutment surfaces 23 in the clamp member 20 may be slightly narrower toward the lower surface.

The interval between the pair of the first abutment surfaces 3 and the interval between the pair of the second abutment surfaces 4 in the cutting insert 1, and the interval between the pair of the third abutment surfaces 22 and the pair of the fourth abutment surfaces 23 in the clamp member 20 both may be narrower at a taper angle substantially equal to each other toward the seating face 2. With such a configuration, a contact area between the elastically deformed fourth abutment surface 23 of the clamp member 20 and the second abutment surface 4 of the cutting insert 1 can be enlarged. That is, the cutting insert 1 can abut the clamp member 20 in a wider region to improve the clamping rigidity at the time of being fixed to the cutting tool 10.

An interval of at least a part between the third abutment surfaces 22 and the fourth abutment surfaces 23 in the clamp member 20 in a side view is larger toward the direction in which the clamp member 20 is closer to the cutting tool 10. This structure also facilitates the contact between the plug element 24 and the cutting insert 1.

It should be noted that, as described above, in a case where the plug element 24 is formed of a material susceptible to elastic deformation for facilitating the elastic deformation, for example, it is preferable that a material of the cutting insert 1 is made of hard metal such as super hard alloy, and a material of the clamp member 20 is made of steel. As described above, even in a case where the plug element is provided in the cutting insert 1 and the concave portion corresponding thereto is provided in clamp member 20, a material of the cutting insert 1 is made of hard metal such as super hard alloy, and a material of the clamp member 20 is made of steel, thereby facilitating the elastic deformation of the concave portion in the clamp member 20.

A rear surface of the cutting insert 1 including the first abutment surface 3 is formed in a convex-shaped, bent or curved surface. That is, the first abutment surface 3 is provided near the upper surface of the cutting insert 1, and a low-position retracted section 3a adjacent thereto is directed downward not to abut the clamp member 20, thereby to be retracted from the clamp member 20. On the other hand, a distance of a contact area 3b (refer to FIG. 8) of the first abutment surface 3 with the clamp member 20 from the seating face 2 differs from a distance of a contact area 4b of the second abutment surface 4 from the seating face 2. Specifically the contact area 3b of the first abutment surface 3 is farther from the seating face 2 than the contact area 4b of the second abutment surface 4. A line of action of a restraining force in the contact area 3b of the first abutment surface 3 and a line of action of a restraining force in the contact area 4b of the second abutment surface 4 are positioned to be substantially in reverse to each other and shifted to each other in a side view. Therefore, the cutting insert 1 and the clamp member 20 are strongly fixed to each other at the fastening, and can easily be released from each other at the replacement of the cutting insert 1. Specifically at the time of loosening the clamp member 20, it is possible to rotate the cutting insert 1 (counterclockwise direction in FIG. 8) in a direction where the low-position retracted section 3a of the cutting insert 1 in the lower surface approaches the clamp member 20 to easily release the fixation between the cutting insert 1 and the clamp member 20. The low-position retracted section 3a may be provided in the clamp member 20 or in each of the cutting insert 1 and the clamp member 20.

In the present embodiment explained hereto, the second abutment surface 4 of the cutting insert 1 abuts the fourth abutment surface 23 of the clamp member 20. However, the second contact 4 may not make contact therewith. For example, the concave portion 5 of the cutting insert 1 may abut a lower surface 27 (refer to FIG. 15) of the plug element 24 in the clamp member 20. That is, in place of the contact by the second abutment surface 4, a bottom surface 9 (refer to FIG. 6 and FIG. 7) of the concave portion 5 may abut the lower surface 27 of the plug element 24.

In addition to the abutments by the first abutment surface 3 and the second abutment surface 4, a third type of abutment by the bottom surface 9 of the concave portion 5 is made possible. When the three types of abutment are thus made, the fastening between the cutting insert 1 and the clamp member 20 is furthermore strengthened.

Figure 8:
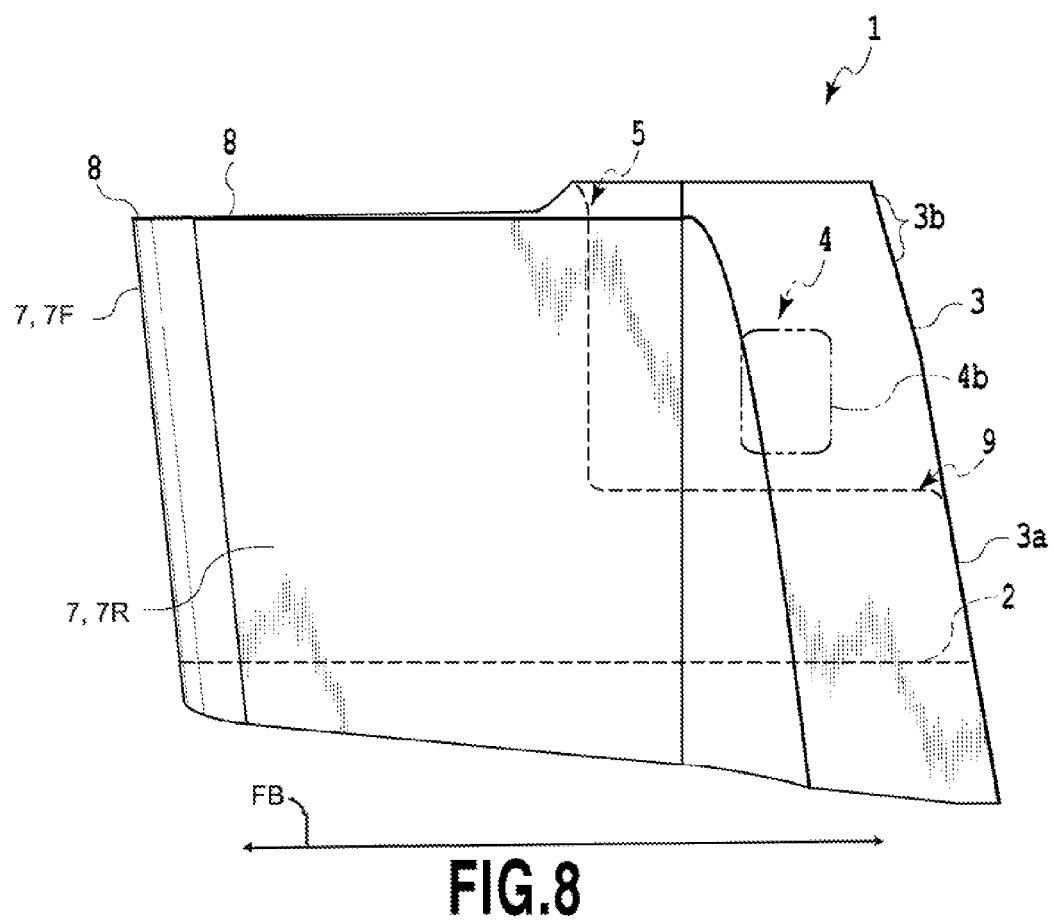
FIG. 8 is a right side view of the cutting insert shown in FIG. 6.

Either one of the lower surface 27 of the plug element 24 and the bottom surface 9 of the concave portion 5 is preferably inclined relative to the guide direction A. This direction of inclination is preferably a direction of attracting the cutting insert 1 to the backward side by contact between the lower surface 27 of the plug element 24 and the bottom surface 9 of the concave portion 5. That is, a distance between the lower surface 27 of the plug element 24 and the bottom surface 9 of the concave portion 5, and a distance between the seating face 2 and the guide face 11 are preferably larger as closer to the backward side of the cutting insert 1. This inclination increases a function of resisting a force in a direction of pulling out the cutting insert 1 during cutting. Preferably an inclination angle thereof is in a range from one degree to 30 degrees. In FIG. 8, the present embodiment is configured such that the bottom surface 9 extends substantially horizontally in the right and left, the seating face 2 is formed as an inclined face that is lowered more downward from right to left, and a relative inclination angle thereof is approximately 5 degrees. The inclination angles of the lower surface 27 and the bottom surface 9 to the guide direction A may be equal to or differ from each other.

The plug element 24 may, in a state where the cutting insert 1 is fastened thereto, allow an outer periphery thereof (that is, lateral side) not to abut the concave portion 5. The contact between the cutting insert 1 and the clamp member 20 may be made only between the bottom surface 9 of the concave portion 5 and the lower surface 27 of the plug element 24. In this case, the way of use thereof can be made similar to the conventional clamp mechanism. An advantage in this case as compared to the conventional technology is that the cutting insert 1 is hard to be pulled out from the clamp member 20 at the time the clamp member 20 is released. That is, at replacement of the cutting insert 1, a possibility of an unintended drop of the cutting insert 1 is reduced. This is because, when the plug element 24 of the clamp member 20 interferes with the concave portion 5 of the cutting insert 1, the plug element 24 cannot be pulled out of the concave portion 5 in a direction of crossing the forward/backward direction of the clamp member 20 from a state where the plug element 24 is inserted inside the concave portion 5. It should be noted that for suppressing the plug element 24 from being pulled out of the concave portion 5, it is preferable that the minimum interval of the concave portion 5 is smaller than the maximum width of the plug element 24.

The clamp member 20 is preferably formed in a wedge shape as viewed from the right side face or left side face. That is, it is preferable that an extension direction (that is, sliding direction) of the sliding surface 21 is not in parallel to an extension direction of the third abutment surface 22, and a sharp angle is made such that an interval of both is made smaller toward the downward side. With the wedge shape, at the time of fixing the cutting insert 1, the sliding surface 21 is guided strongly to the guide face 12 of the cutting tool 10. The wedge angle, not illustrated, is preferably in a range from one degree to 15 degrees. In the present embodiment, the wedge angle is made to five degrees.

As shown in FIG. 21, the second guide face 12 of the cutting tool 10 has a normal line that is inclined relative to the longitudinal direction of the cutting tool 10. The second guide face 12 gradually approaches the backward side as closer to the lower surface of the cutting tool 10. The first guide face 11 is inclined in such a manner as to gradually approach the lower surface as closer to the backward side of the cutting tool 10. Accordingly, the first guide face 11 and the second guide face 12 cross at a sharp angle as an interior angle therebetween. With this configuration, a block formed of the cutting insert 1 and the clamp member 20 is pushed to the cutting tool 10 by the two guide faces 11 and 12 crossing at the sharp angle. That is, a part of fixing forces by the screw member 30 acts in a direction of pulling in both of the cutting insert 1 and the clamp member 20 to the backward side to increase the clamping rigidity. In addition, the second guide face 12 resists the lifting-up force of the backward side of the clamp member 2 by cutting forces to suppress the lifting-up of the clamp member 20.

A material of a section of the cutting insert 1 in the periphery of the cutting edge is selected from a hard material such as a super hard alloy, cermet, ceramic and a cubic boron nitride sintered compact, a material formed by applying a PVD or CVD coating film on a surface of the above hard materials, or a diamond. A material of the other section of the cutting insert 1 may be the same as the material of the section in the periphery of the cutting edge, but use of a material made of a super hard alloy or formed by applying a PVD or CVD coating film on the super hard alloy is more preferable. Materials of the cutting insert 1 and the clamp member 20 are selected from tool steel, high-speed steel, alloy steel, carbon steel or cast steel.

The cutting tool 10 in the present embodiment is removably attached to a machine tool such as a lathe, and a relative movement to a rotating work material is provided to the cutting tool 10, which performs a cutting work to a work material such as a steel material. The cutting tool in the present invention is applicable to a rotary tool for a machine tool such as a machining center. However, the clamp mechanism of the cutting insert in the present invention has an advantageous characteristic at the time of being adopted in a cutting tool for lathe work to be attached to a machine tool such as a lathe. Particularly at the time of being adopted in a grooving cutting tool, the characteristic and effect become remarkable.

The restraint by the clamp member in the present invention may be applied in a revolving direction instead of the linear direction.

The present invention is not limited to the embodiment explained above, and without mentioning, alternation, addition, and elimination of components thereof are made possible within the scope not departing from the subject matter of the invention.

The invention claimed is:
1. A cutting insert (1) comprising:
an insert body comprising:
  a forward surface extending along a width direction (W) in a plan view of the cutting insert;
  an upper surface extending in a rearward direction from the forward surface in said plan view;
  first and second opposing side surfaces formed on opposites sides of the forward surface and spaced apart from one another along the width direction (W);
  a rear surface spaced apart from the forward surface along a front-back direction (FB) in said plan view of the cutting insert; and
  a seating face (2) extending along the front-back direction (FB);
a forward cutting edge (8) formed on an intersection ridge line between the forward surface and a rake face (6) formed in the upper surface;
a concave portion (5) formed in both the upper and rear surfaces, the concave portion being rearward of the forward cutting edge (8) and having a bottom surface (9) visible in the plan view; wherein:
in the plan view, the concave portion (5) includes a swollen section (5a) having a first width dimension (W1) in the width direction (W) and a narrow section (5b) having a second width dimension (W2) in the width direction (W), the second width dimension (W2) being smaller than the first width dimension (W1); and
in the plan view, the swollen section (5a) is closer to the forward cutting edge (8) than the narrow section (5b).
2. The cutting insert (1) according to claim 1, wherein:
the rear surface comprises at least a pair of first abutment surfaces (3) on either side of the concave portion (5);
the inner side walls comprise at least a pair of second abutment surfaces (4); and
in the plan view, an angle (α) between a normal line (3n) of at least one of the first abutment surfaces (3) and a normal line (4n) of at least one of the second abutment surfaces (4) exceeds 90 degrees.
3. The cutting insert (1) according to claim 1, wherein the rear surface comprises at least a pair of first abutment surfaces (3) on either side of the concave portion (5); and
at least one of the first abutment surfaces (3) is inclined relative to the front-back direction (FB) of the seating face (2) in a side view.
4. The cutting insert (1) according to claim 2, wherein a spacing between at least portions of at least the pair of the second abutment surfaces (4) gradually narrows in a direction of the seating face (2).
5. The cutting insert (1) according to claim 1, wherein, the cutting insert (1) is formed in a substantially square shape in a plan view and is provided with a cutting edge on at least one side thereof to be adapted to be used for grooving cutting work or shearing cutting work.
6. The cutting insert (1) according to claim 1, wherein:
the cutting insert is adapted for grooving;
in the plan view, the forward cutting edge (8) defines a maximum width of the cutting insert; and
in the plan view, side cutting edges formed at the intersection of the upper surface and the opposing side surfaces connect to, and extend rearwardly from, either side of the forward cutting edge (8).
7. The cutting insert (1) according to claim 1, wherein:
the cutting insert has only a single concave portion (5).
8. A cutting tool (10) comprising:
a first chip seat (14) having an associated first screw hole (13) disposed nearby;
a cutting insert (1) according to claim 1 seated in the chip seat (14);
a clamp member (20) comprising a plug element (24) abutting the concave portion (5) of the cutting insert (1), and a second screw hole (26); and
a screw member (30) having a first screw portion (31) threadingly engaged to the first screw hole (13) and a second screw portion (32) threadingly engaged to the second screw hole (26).

* * * * *